(12) United States Patent
Shin et al.

(10) Patent No.: US 11,540,235 B2
(45) Date of Patent: Dec. 27, 2022

(54) APPARATUS AND METHOD FOR POWER CONTROL IN WIRELESS COMMUNICATION SYSTEM

(71) Applicant: Samsung Electronics Co., Ltd., Suwon-si (KR)

(72) Inventors: Daekyu Shin, Suwon-si (KR); Dongwoo Lee, Suwon-si (KR); Younggoo Han, Suwon-si (KR); Jiyun Seol, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/983,122

(22) Filed: Aug. 3, 2020

(65) Prior Publication Data

US 2021/0037482 A1 Feb. 4, 2021

(30) Foreign Application Priority Data

Aug. 2, 2019 (KR) .......................... 10-2019-0094595

(51) Int. Cl.
*H04W 52/36* (2009.01)
*H04W 72/04* (2009.01)
(Continued)

(52) U.S. Cl.
CPC ....... *H04W 52/365* (2013.01); *H04W 52/146* (2013.01); *H04W 72/0413* (2013.01);
(Continued)

(58) Field of Classification Search
CPC . H04W 52/146; H04W 52/34; H04W 52/346; H04W 52/365; H04W 72/0413;
(Continued)

(56) References Cited

U.S. PATENT DOCUMENTS

| 9,357,510 B2 | 5/2016 | Damnjanovic et al. |
| 10,085,265 B2 | 9/2018 | Vajapeyam et al. |

(Continued)

FOREIGN PATENT DOCUMENTS

| EP | 3178292 | 6/2017 |
| EP | 3499981 A1 | 6/2019 |

(Continued)

OTHER PUBLICATIONS

Oualcomm Inc. et al., Cross cell group power management in MR-DC, R2-1906709, 3GPP TSG-RAN WG2 Meeting #106, Reno, USA, May 3, 2019.

(Continued)

*Primary Examiner* — Rina C Pancholi
(74) *Attorney, Agent, or Firm* — Jefferson IP Law, LLP

(57) ABSTRACT

The disclosure relates to a pre-5$^{th}$-Generation (5G) or 5G communication system to be provided for supporting higher data rates Beyond 4$^{th}$-Generation (4G) communication system, such as Long Term Evolution (LTE). A power distribution apparatus in a wireless communication system is provided. The apparatus includes at least one transceiver, and at least one processor, wherein the at least one processor is configured to identify a cell group set for a particular transmission interval among multiple cell groups connected to a terminal, perform a distribution of a power for the terminal to each of cell groups in the cell group set, and transmit power allocation information according to a result of the distribution to the terminal, wherein the cell group set includes a cell group including one or more cells in which uplink transmission is to be performed at the particular transmission interval.

8 Claims, 13 Drawing Sheets

(51) Int. Cl.
*H04W 72/10* (2009.01)
*H04W 52/14* (2009.01)
*H04W 88/06* (2009.01)
*H04L 1/18* (2006.01)
*H04L 5/00* (2006.01)

(52) U.S. Cl.
CPC ........... *H04W 72/10* (2013.01); *H04L 1/1812* (2013.01); *H04L 5/0048* (2013.01); *H04W 72/0446* (2013.01); *H04W 72/0473* (2013.01); *H04W 88/06* (2013.01)

(58) Field of Classification Search
CPC ........... H04W 72/044; H04W 72/0446; H04W 72/0473; H04W 72/10; H04W 88/06; H04W 52/281; H04W 76/16; H04L 1/1812; H04L 1/1854; H04L 5/0048
See application file for complete search history.

(56) References Cited

U.S. PATENT DOCUMENTS

| | | | | |
|---|---|---|---|---|
| 2015/0215943 | A1* | 7/2015 | Vajapeyam | H04W 72/0473 370/329 |
| 2016/0157184 | A1 | 6/2016 | Wang et al. | |
| 2017/0230917 | A1* | 8/2017 | Ouchi | H04L 1/1812 |
| 2018/0242264 | A1 | 8/2018 | Pelletier et al. | |
| 2019/0104476 | A1 | 4/2019 | Lim et al. | |
| 2019/0208478 | A1 | 7/2019 | Park et al. | |
| 2019/0223115 | A1* | 7/2019 | Chen | H04L 5/001 |
| 2019/0230602 | A1* | 7/2019 | Gao | H04W 72/04 |

FOREIGN PATENT DOCUMENTS

| | | |
|---|---|---|
| KR | 10-2019-0017707 A | 2/2019 |
| WO | 2016022211 A1 | 2/2016 |

OTHER PUBLICATIONS

International Search Report dated Nov. 25, 2020, issued in International Application No. PCT/KR2020/010211.
3rd Generation Partnership Project, (3GPP), TS 36.213 V15.6.0, Rel. 15, Jun. 2019.
Sharp, "UL power control for dual connectivity," 3GPP TSG RAN WG1 Meeting #77, R1-142201, Seoul, Korea, May 19-23, 2014.
European Search Report dated Aug. 12, 2022, issued in European Application No. 20849178.7.

* cited by examiner

APPARATUS AND METHOD FOR POWER CONTROL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0094595, filed on Aug. 2, 2019, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for power control in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A communication service that is effective in the multiple-connectivity system in which base stations and terminals are connected through independent radio access technologies may be provided. There is a need for a method of distributing power for each cell group within predetermined power with the introduction of the multiple-connectivity system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for power allocation of a multiple-connectivity system in a wireless communication system.

Another aspect of the disclosure is to provide an apparatus and a method for distributing power for cell groups of a multiple-connectivity system in a wireless communication system.

Another aspect of the disclosure is to provide an apparatus and a method for transmission interval-based power distribution in a wireless communication system.

Additional aspects will be set forth in part in the description which follows and, in part, will be apparent from the description, or may be learned by practice of the presented embodiments.

In accordance with an aspect of the disclosure, a power distribution method in a wireless communication system is provided. The method includes identifying a cell group set for a particular transmission interval among multiple cell groups connected to a terminal, performing a distribution of a power for the terminal to each of cell groups in the cell group set, and transmitting power allocation information according to a result of the distribution to the terminal, wherein the cell group set includes a cell group including one or more cells in which uplink transmission is to be performed at the particular transmission interval.

In accordance with another aspect of the disclosure, a power distribution apparatus in a wireless communication system is provided. The apparatus includes at least one transceiver, and at least one processor, wherein the at least one processor is configured to identify a cell group set for a particular transmission interval among multiple cell groups connected to a terminal, perform a distribution of a power for the terminal to each of cell groups in the cell group set, and transmit power allocation information according to a result of the distribution to the terminal, wherein the cell group set includes a cell group including one or more cells in which uplink transmission is to be performed at the particular transmission interval.

In accordance with another aspect of the disclosure, an apparatus and a method allocates power appropriate for each cell group, thereby improving uplink performance of a terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
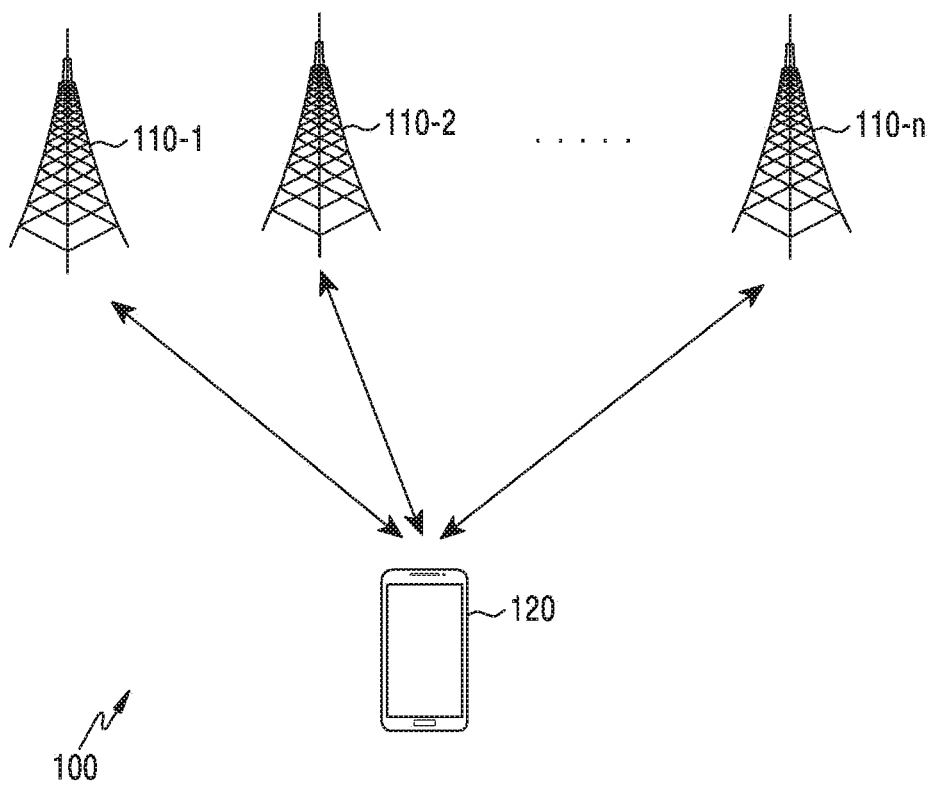
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and a method for power control in a wireless communication system. Specifically, the disclosure describes a technology for distributing power based on the state of each cell group in a wireless communication system.

Hereinafter, terms (e.g., dual-connectivity (DC), multi-radio-technology (RAT) (MR)-DC, a cell group, a master cell group (MCG), and a secondary cell group (SCG)) related to a power-related parameter (e.g., configured power, transmit power control (TPC), a command, and multiple-connectivity), terms (e.g., a reference signal, system information, a control signal, a message, and data) indicating a signal, and terms (e.g., a communication node, a radio node, a radio unit, a network node, a master node (MN), a secondary node (SN), a transmission/reception point (TRP), a digital unit (DU), a radio unit (RU), and a massive multiple-input multiple output (MIMO) unit (MMU)) indicating network entities are mere examples selected for the convenience of description. Accordingly, the disclosure is not limited to the terms used below, and other terms having equivalent technical meanings may be used.

Further, although the disclosure describes various embodiments using terms used in some communication standards (e.g., 3$^{rd}$ Generation Partnership Project (3GPP)), these are merely illustrative examples. Various embodiments can be easily modified and applied to other communication systems as well.

FIG. 1 illustrates a wireless communication system 100 according to an embodiment of the disclosure.

Referring to FIG. 1, it illustrates base stations 110-1, 110-2, . . . , 110-$n$ and a terminal 120, as some of nodes using a wireless channel in a wireless communication system. The base stations 110-1, 110-2, . . . , 110-$n$ may be connected to the terminal 120 through multiple-connectivity (e.g., dual-connectivity (DC)). Hereinafter, for the convenience of description, a common description for each of the base stations 110-1, 110-2, . . . , 110-$n$ may be referred to and described as a "base station 110".

The base stations 110-1, 110-2, . . . , 110-$n$ are a network infrastructure providing radio access to a terminal 120. The base station 110 may have a coverage that is defined to be a predetermined geographical region based on a distance within which a signal is transmitted. The term "coverage" used hereinafter may indicate a service coverage area in the base station 110. The base station 110 may cover one cell and also cover multiple cells. Here, frequencies for supporting multiple cells may be divided by an area of a covering sector.

The base station 110 may be referred to as an "access point (AP)" an "eNodeB (eNB)", a "5$^{th}$ generation node (5G node)", a "5G NodeB (NB)", a "next generation node B (gNB)", a "wireless point", a "transmission/reception point (TRP)", a "distributed unit (DU)", a "radio unit (RU)", a "remote radio head (RRH)", or other terms having technical meanings equivalent to those of the above-described terms, in addition to "base station". According to various embodiments of the disclosure, the base station 110 may be connected to at least one "transmission/reception point (TRP)". The base station 110 may transmit a downlink signal to the terminal 120 or receive an uplink signal from the terminal 120 through the at least one TRP.

The terminal 120 is a device used by a user, and performs communication with the base station 110 through a wireless channel. In some cases, the terminal 120 may be operated without a user's involvement. For example, the terminal 120 may be a device for performing machine-type communication (MTC), and may not be carried by a user. The terminal 120 may be referred to as a "user equipment (UE)", a "mobile station (MS)", a "subscriber station", a "customer premises equipment (CPE)", a "remote terminal", a "wireless terminal", an "electronic device", a "vehicular terminal", a "user device", or other terms having technical meanings equivalent to those of the above-described terms, in addition to "terminal".

A dual-connectivity (DC) technology that is a type of multiple-connectivity has been introduced from Release 12 of $3^{rd}$ Generation Partnership Project (3GPP) standard. The dual-connectivity technology is a technology for enhancing frequency-usage efficiency of a terminal and a base station, wherein a terminal is simultaneously connected to two independent heterogeneous or homogeneous wireless communication cell groups having a separate radio resource control entity and uses a frequency resource on a component carrier of a cell in each of cell groups located in different frequency bands for signal transmission or reception. The dual-connectivity includes a master cell group in which a control plane is directly connected to a core network and manages the radio resource control state of a terminal, and a secondary cell group interworking with the master cell group.

A carrier aggregation (CA) technology is a technology introduced in Release 10 of the 3GPP standard. The CA technology is a technology for enhancing frequency-usage efficiency of a terminal and a base station, wherein a terminal is connected to a homogeneous wireless communication cell group having a common radio resource control entity and simultaneously uses a frequency resource on a component carrier of each cell located in different frequency bands for signal transmission or reception.

The dual-connectivity technology and the carrier aggregation technology have technical advantages of enhancing efficiency in using limited wireless communication resources of a terminal and a base station and thus have been actively studied in academic fields. Especially, a basic management method of a 5G mobile communication system is based on non-stand-alone operation interworking with a 4G core network. Accordingly, the dual-connectivity technology and the carrier aggregation technology have been utilized as core technologies in commercial service supporting the 5G mobile communication system.

In independently performing dual-connectivity between cell groups or complexly performing dual-connectivity and carrier aggregation, when transmission power of a terminal is not properly controlled while allowing only transmission power fixed in each cell group, this may lead to a problem in that the maximum transmission power usable by the terminal may not be all used and power may be unnecessarily left over. Further, when dual-connectivity is not managed due to inefficient power consumption which means power is unnecessarily used for a particular carrier while the other carrier experiences lack of power, uplink performance of a terminal may deteriorate. In addition, when a base station causes a terminal to use power beyond the receivable level, an abnormal operation may occur in a terminal, such as unnecessary reduction of transmission power on a particular carrier, no uplink transmission, or the like, thereby causing deterioration of the uplink communication quality.

Since the deterioration of the uplink communication quality may cause a reliability loss in acknowledgement response (HARQ-ACK feedback) information and channel state information for downlink data transmission as well as those for uplink transmission of a terminal to be transmitted to the uplink, inefficient usage of transmission power by a terminal may cause deterioration of the downlink communication quality as well as the deterioration of the uplink communication quality.

In order to address above-described issues, various embodiments relate to a base station apparatus for cell group-specific distribution operation in a mobile communication system in which multiple-connectivity of simultaneously using multiple frequency resources between multiple cell groups supporting heterogeneous or homogeneous wireless communication is configured or multiple-connectivity and the CA are configured together. At least one base station apparatus may perform a real-time terminal transmission power distribution operation and a non-real-time terminal transmission power distribution operation for dynamically distributing limited transmission power between cell groups by a terminal.

In managing multiple-connectivity between multiple cell groups supporting heterogeneous or homogeneous wireless communication or complexly managing multiple-connectivity and carrier aggregation, various embodiments suggest a power allocation method for preventing a terminal from reducing transmission power and inefficiently using the power and improving the uplink transmission quality by performing an operation of dynamically controlling terminal transmission power according to the level of an uplink channel of a carrier according to each cell in a cell group. Further, various embodiments are not limited to dual-connectivity, and may be applied to general multiple-connectivity including three or more cell groups and to a base station operation or an apparatus for enhancing the uplink communication quality of a terminal.

A power allocation method according to various embodiments may include an independent operation between one or more base station apparatuses constituting multiple-connectivity between multiple cell groups and an operation of each individual apparatus constituting multiple-connectivity may include an independent operation of one or more cells for controlling a component carrier frequency resource in a base station.

In various embodiments of the disclosure, the case in which base stations 110-1, 110-2, . . . , 110-$n$ are connected to a terminal 120 through multiple-connectivity is described. As described above, multiple-connectivity refers to a communication technology of connecting a terminal 120 to each of base stations 110-1, 110-2, . . . , 110-$n$ through a radio technology (RAT). For example, a terminal 120 may be connected to each of two base stations through dual-connectivity (DC) that is a type of multiple-connectivity. For example, a terminal 120 may be connected to an eNB through long term evolution (LTE) and may be connected to a gNB through new radio (NR). Each base station may be referred to as a communication node. One or more cells provided at one base station may be referred to as a cell group. For example, a base station may support one or more cell groups. A base station providing a master cell group (MCG) may provide a master mode (MN) and a base station providing a secondary cell group (SCG) may provide a secondary node (SN). In various embodiments of the disclosure, relationships between base stations and cell groups may be variously defined. According to an embodiment of the disclosure, a base station may provide a cell group. Further, according to another embodiment of the disclosure, a base station may provide one or more cell groups. Specific relationships therebetween will be described in FIGS. 2A and 2B below. Further, according to an embodiment of the disclosure, each base station may perform carrier aggregation (CA). In this case, a terminal may perform CA with the base station through cells in each cell group.

In various embodiments of the disclosure, multiple-connectivity may be independently configured, or multiple-connectivity and CA may be configured together. The disclosure relates to a base station apparatus and a method for performing an operation of controlling distribution of terminal transmission power in real-time and an operation of controlling distribution of terminal transmission power not in real-time, in a cell in each cell group. Cell groups constituting multiple-connectivity may be referred to and described as a first cell group, a second cell group, . . . , and an $M^{th}$ cell group, respectively. In the disclosure, the first cell group may be interchanged with a master cell group or a primary cell group constituting multiple-connectivity, and the second cell group, . . . , and the $M^{th}$ cell group may be interchangeably referred to as a secondary cell group.

Figure 2A:
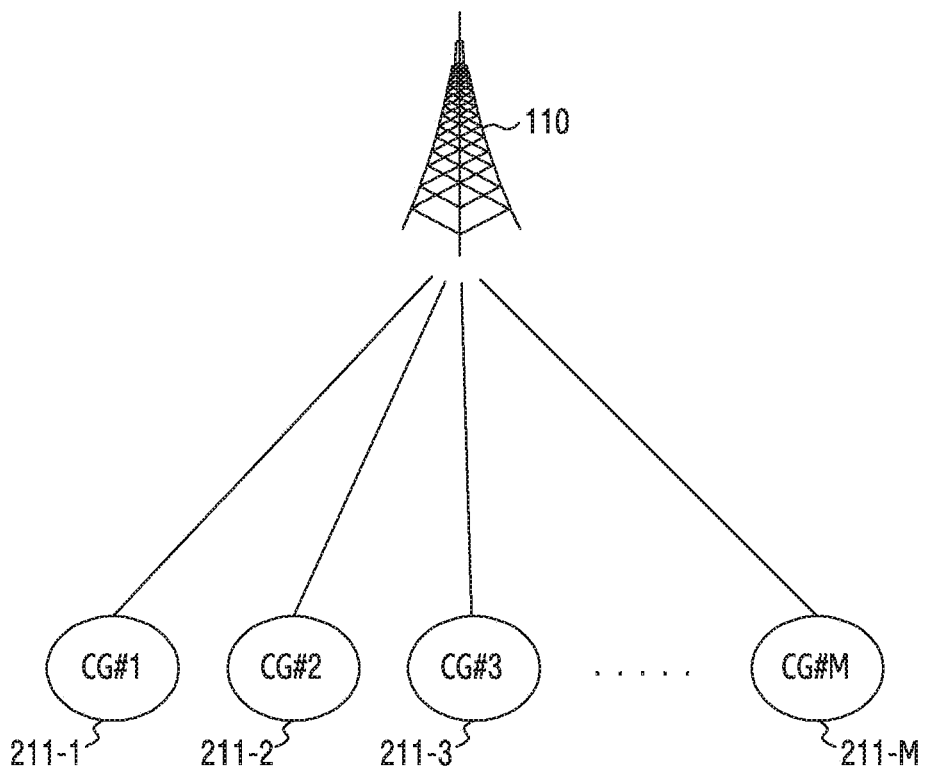
FIG. 2A illustrates cell groups in a wireless communication system according to an embodiment of the disclosure.

FIG. 2A illustrates cell groups in a wireless communication system according to an embodiment of the disclosure. The wireless communication system in FIG. 2A illustrates the case in which one base station manages all cell groups.

Referring to FIG. 2A, the base station 110 may provide multiple cell groups 211-1, 211-2, 211-3, . . . , 211-M to a terminal. Each of the multiple cell groups may include at least one cell. Each cell may transmit an uplink signal and the base station 110 may calculate necessary transmission power for the uplink signal for each cell. In order to perform power distribution operations described below, the base station 110 may include: a receiver of a terminal uplink signal; an inter-cell-group information sharing unit for sharing information required to perform a dynamic power control operation with other cell groups; an information processor for managing inter-cell information received for M cell groups; and a terminal transmission power controller for controlling terminal transmission power for each cell group based on the acquired information. The uplink signal receiver, the information processor, and the transmission power controller may be configured in units of cell groups or in units of cells.

In FIG. 2A, it is described that one base station manages all cell groups, but the disclosure is not limited thereto. In some embodiments of the disclosure, a separate network entity connected to a base station may perform a power distribution procedure to be described below.

Figure 2B:
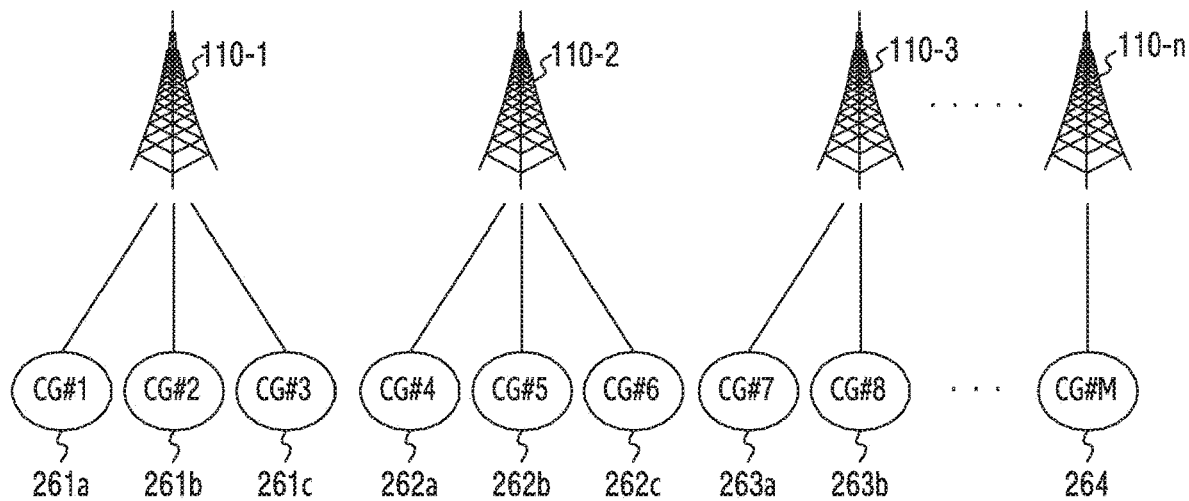
FIG. 2B illustrates cell groups in a wireless communication system according to an embodiment of the disclosure.

FIG. 2B illustrates cell groups in a wireless communication system according to an embodiment of the disclosure. The wireless communication system of FIG. 2B illustrates the case in which two or more base stations manage all cell groups. The two or more base stations may include base stations 110-1, 110-2, . . . , 110-n.

Referring to FIG. 2B, the base stations 110-1, 110-2, . . . , 110-n may provide multiple cell groups 211-1, 211-2, 211-3, . . . , 211-M to a terminal. In this case, the number of cell groups connected to each of the base stations may be different for each of the base stations.

For example, a first base station 110-1 may provide three cell groups (e.g., CG #1 261a, CG #2 261b, and CG #3 261c) to a terminal. A second base station 110-2 may provide three cell groups (e.g., CG #4 262a, CG #5 262b, and CG #6 262c) to a terminal. A third base station may provide two cell groups (e.g., CG #7 263a and CG #8 263b) to a terminal. An $n^{th}$ base station may provide one cell group (e.g., CG #M 264) to a terminal.

Each of multiple cell groups may include at least one cell. Each cell may transmit an uplink signal and each base station 110-i may calculate necessary transmission power for the uplink signal for each cell. In order to perform power distribution operations described below, the base station 110 may include: a receiver of a terminal uplink signal; an inter-cell-group information sharing unit for sharing information required to perform a dynamic power control operation with other cell groups; an information processor for managing inter-cell information received for M cell groups; and a terminal transmission power controller for controlling terminal transmission power for each cell group based on the acquired information. The uplink signal receiver, the information processor, and the transmission power controller may be configured in units of cell groups or in units of cells. According to an embodiment of the disclosure, an inter-cell-group information sharing unit in a base station may determine a dynamic power distribution mode between base stations and transmit the result of power distribution, determined according to a corresponding distribution mode to an inter-cell-group information sharing unit of another base station. Further, according to an embodiment of the disclosure, an inter-cell-group information sharing unit of each base station may transmit information on the maximum distributable resource of each cell constituting a cell group in a corresponding base station to an inter-cell information sharing unit of another base station.

In FIG. 2B, unlike FIG. 2A, as multiple base stations, rather than single base station, manage multiple-connectivity, various information may be signaled between base stations for power distribution. According to an embodiment of the disclosure, a particular base station may transmit whether dynamic power distribution is supported by a terminal to another base station (e.g., an inter-cell-group information sharing unit of another base station). In this case, whether dynamic power distribution is supported may be identified from dynamicPowerSharing information of a terminal in the case of dual-connectivity wherein a first cell group is 4G and a second cell group is 5G, in the case of dual-connectivity wherein a first cell group is 5G and a second cell group is 4G, or in the case of dual-connectivity wherein a first cell group is 5G and a second cell group is 5G.

Further, according to an embodiment of the disclosure, an inter-cell-group information sharing unit of each base station may transmit information on the maximum distributable resource of each cell constituting a cell group in a corresponding base station to an inter-cell-group information sharing unit of another base station.

Further, according to an embodiment of the disclosure, an inter-cell-group information sharing unit of a base station providing a particular cell group (e.g., a MCG) may transmit, to an inter-cell-group information sharing unit of another cell group, the maximum transmission power of a terminal for all cells in each cell group and the maximum transmission power of a terminal for all cells constituting multiple-connectivity, including the maximum transmission power of a terminal for all cells in the particular cell group.

In FIG. 2B, it is described that multiple base stations manage all cell groups, but the disclosure is not limited thereto. In some embodiments of the disclosure, a separate network entity connected to multiple base stations may perform a power distribution procedure to be described below.

Figure 3:
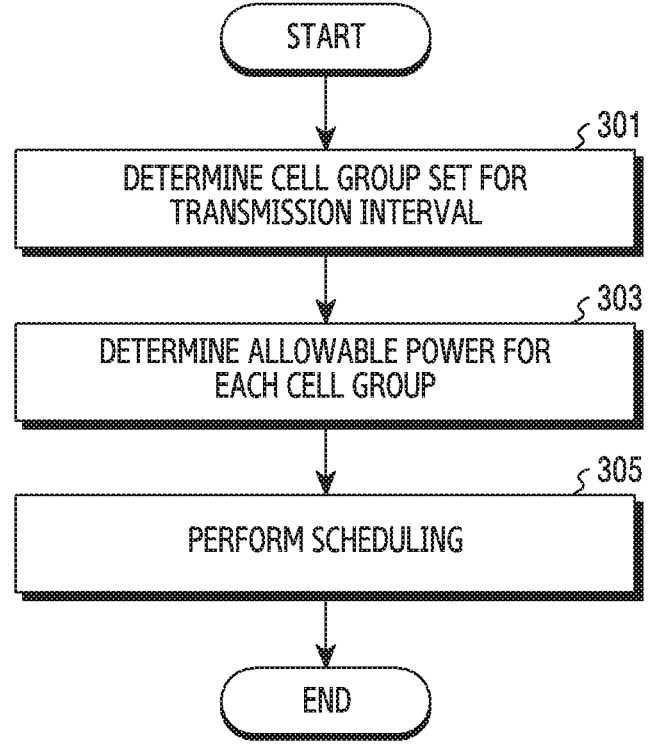
FIG. 3 is a flowchart illustrating an operation of a base station for allocating power in a wireless communication system according to an embodiment of the disclosure.

FIG. 3 is a flowchart illustrating an operation of a base station 110 for power allocation in a wireless communication system according to an embodiment of the disclosure. The base station 110 indicates a network entity for performing power distribution for multiple base stations in a multiple-connectivity relationship. Hereinafter, embodiments are described on the assumption that an entity performing power distribution is a base station. However, multiple base stations, rather than single base station, may share power distribution functions or a separate communication node may perform power distribution.

Referring to FIG. 3, in operation 301, the base station 110 may determine a cell group set for a transmission interval. In the disclosure, a transmission interval may include one or more transmission time intervals (TTIs). According to an embodiment of the disclosure, when a transmission interval includes one TTI, power distribution operations to be described below may be referred to as instantaneous power distribution (or real-time power distribution). Further, according to an embodiment of the disclosure, when a transmission interval includes more than one TTI, power distribution operations to be described below may be referred to as non-instantaneous power distribution. Further, according to an embodiment of the disclosure, when transmission intervals are periodically configured, power distribution operations to be described below may be referred to as periodical power distribution.

The base station 110 may identify cells in which an uplink signal is transmitted during a transmission interval. The base station 110 may identify cell groups corresponding to the identified cells. The base station 110 may include cell groups including a cell in which uplink transmission (e.g., uplink control information (UCI) transmission or uplink data transmission) is performed during a transmission interval, to a cell group set for the transmission interval. For example, in the case of the instantaneous power distribution, in Subframe #0, a cell group of a cell in which uplink transmission is performed may be included in a cell group set. A specific operation will be described in FIG. 4.

In operation 303, the base station 110 may determine allowable power for each cell group. The transmission power may be limited by the terminal 120 due to performance limits of hardware. For example, the base station 110 may allocate power based on the maximum power of the terminal 120. In this case, the maximum power of the terminal 120 may mean power distributable to the terminal 120 (hereinafter, referred to as "distributable power"). The base station 110 may determine the maximum power for each cell group. For example, the base station 110 may determine the maximum transmission power of a terminal for all cells in an $m^{th}$ cell group. The base station 110 may calculate necessary power for each cell in each cell group. The base station 110 may determine allowable power for each cell group based on the sum of the calculated power for each cell, distributable power, and the maximum power for each cell group. For example, the base station 110 may distribute distributable power to each cell group.

According to various embodiments of the disclosure, the base station 110 may not allocate a fixed magnitude of power to a cell group, but may rather allocate dynamically distributable power to each cell group based on power information corresponding to a particular interval, in real-time, periodically, or at a certain time point. Hereinafter, a method of allocating distributable power to cell groups based on a time point at which power is actually allocated may be referred to as "transmission interval-based power distribution". The power distribution may be referred to and described as "power sharing".

According to various embodiments of the disclosure, the base station 110 may consider various conditions when distributing power to each cell group. In some embodiments of the disclosure, the base station 110 may allocate distributable power in the order of power allocation for a cell group. For example, the base station 110 may sequentially distribute power to a cell group according to a designated order. By allocating as much power as possible, inefficiency which may occur due to no power distribution can be reduced. For example, when it is assumed that distributable power is 10, necessary power of a first cell group is 3, necessary power of a second cell group is 9, and necessary power of a third cell group is 5, the base station 110 may allocate power of 3 to the first cell group, power of 7 to the second cell group, and power of 0 to the third cell group. Specific operations will be described in FIG. 5.

Further, in some embodiments of the disclosure, the base station 110 may preferentially allocate power for a cell to which control information is transmitted and distribute the power remaining after excluding the preferentially allocated power, to a cell group. Here, the control information indicates information transmitted through a physical uplink control channel (PUCCH), and may be, for example, UCI. For example, the control information may include at least one of hybrid ARQ (HARQ) acknowledge/non-acknowledge (ACK/NACK), channel state information (CSI), and scheduling request (SR). The transmission of the control information may be preferentially performed over general data transmission (e.g., physical uplink shared channel (PUSCH) transmission), and the case in which even SCG control information is not transmitted may be reduced. For example, when it is assumed that distributable power is 100, power required for control information transmission of a first cell group is 50, power required for data transmission of the first cell group is 60, power required for control information transmission of a second cell group is 40, and power required for data transmission of the second cell group is 70, the base station 110 may allocate power of 50 for the control information transmission of the first cell group, power of 40 for the control information transmission of the second cell group, power of 10 for the data transmission of the first cell group, and power of 0 for the data transmission of the second cell group. Specific operations will be described in FIG. 6.

Further, in some embodiments of the disclosure, the base station 110 may allocate power for each cell group based on a power distribution ratio designated for cell groups. The designated ratio may be recalculated for each transmission interval. In operation 301, a cell group set is determined for each transmission interval, and the ratio according thereto may be recalculated for each transmission interval. The power is not distributed across cell groups according to the cell group order, but is distributed according to a particular metric, and thus the case in which no uplink transmission from a cell group having the lower priority is performed may be prevented. According to an embodiment of the disclosure, the designated ratio may be determined based on a power allocation history, a power headroom report (PHR), a buffer status report (BSR), the number of cells included in a cell group, and the like. Specific operations will be described in FIG. 7.

Further, in some embodiments of the disclosure, the base station 110 may allocate power for each cell group based on a cell-specific priority. When only the priority for a cell group is considered, the case in which even a cell group including important information has the lower priority than other cell groups and the information fails to be transmitted may occur. Accordingly, it may have an actual benefit when the priority is determined based on each cell, rather than a cell group. According to an embodiment of the disclosure, the cell-specific priority may be determined based on the type of information transmitted to a corresponding cell (e.g., a UCI type, a MAC CE type, or data), the channel quality of a corresponding cell, the type of communication service of a corresponding cell (e.g., ultra-reliable low-latency communication (URLLC)), and the like. Specific operations will be described in FIG. 8.

The power distribution may be performed for a cell group according to various methods other than the above-described four methods. In addition, the base station 110 may also distribute power to cell group by combining two or more power distribution methods among the above-described four methods. For example, the base station 110 may preferentially allocate power required for control information transmission and then distribute the remaining power to each cell group considering the priority for each cell. Further, for example, the base station 110 may preferentially distribute power required for control information transmission and distribute the remaining power to each cell group according the designated ratio.

In operation 305, the base station 110 may perform scheduling. The scheduling may include power allocation according to various embodiments. The base station 110 may distribute power according to the allowable power for each cell group, determined in operation 303. In some embodiments of the disclosure, the base station 110 may perform scheduling of the terminal 120 by itself according to power allocation information according to the power allowable for each cell group. For example, as in FIG. 2A, the base station 110 may control all cell groups connected to the terminal 120. The base station 110 may distribute power in units of cell groups. The base station 110 may distribute power to the terminal 120 by transmitting an uplink approval (e.g., DCI format 0 and 4 of LTE and DCI format 0_0 and 0_1 of NR) from a corresponding cell according to the allowable power for each cell group. In some other embodiments of the disclosure, the base station 110 may transmit cell group-specific power allocation information allocated in operation 303 to other base stations. For example, as in FIG. 2B, a base station other than the base station 110 may additionally control at least one cell group among cell groups connected to the terminal 120. The other base station may allocate power to a cell group of the other base station based on the received power allocation information from the base station 110.

The base station 110 may allocate power to the terminal 120 through downlink signaling. The base station 110 may allocate power to the terminal 120 by transmitting downlink control information (DCI). The DCI may include resource allocation information. Depending on the number of resource blocks (RBs) allocated to a terminal, the magnitude of power transmittable to the terminal may be different. This is because unit power is allocated to a resource element (RE), and as the number of resource blocks increases, the number of REs increases. In the disclosure, embodiments are described with reference to a method of allocating power to the terminal 120 through resource allocation, but power may be allocated according to methods other than the resource allocation. For example, the base station 110 may control an uplink power value of the terminal 120 through a TPC command. Further, for example, the base station 110 may control an uplink power value by separately transmitting control information. Further, for example, the base station 110 may control an uplink power value by activating or deactivating a carrier through a MAC CE.

Cell Group Set Determination

Figure 4:
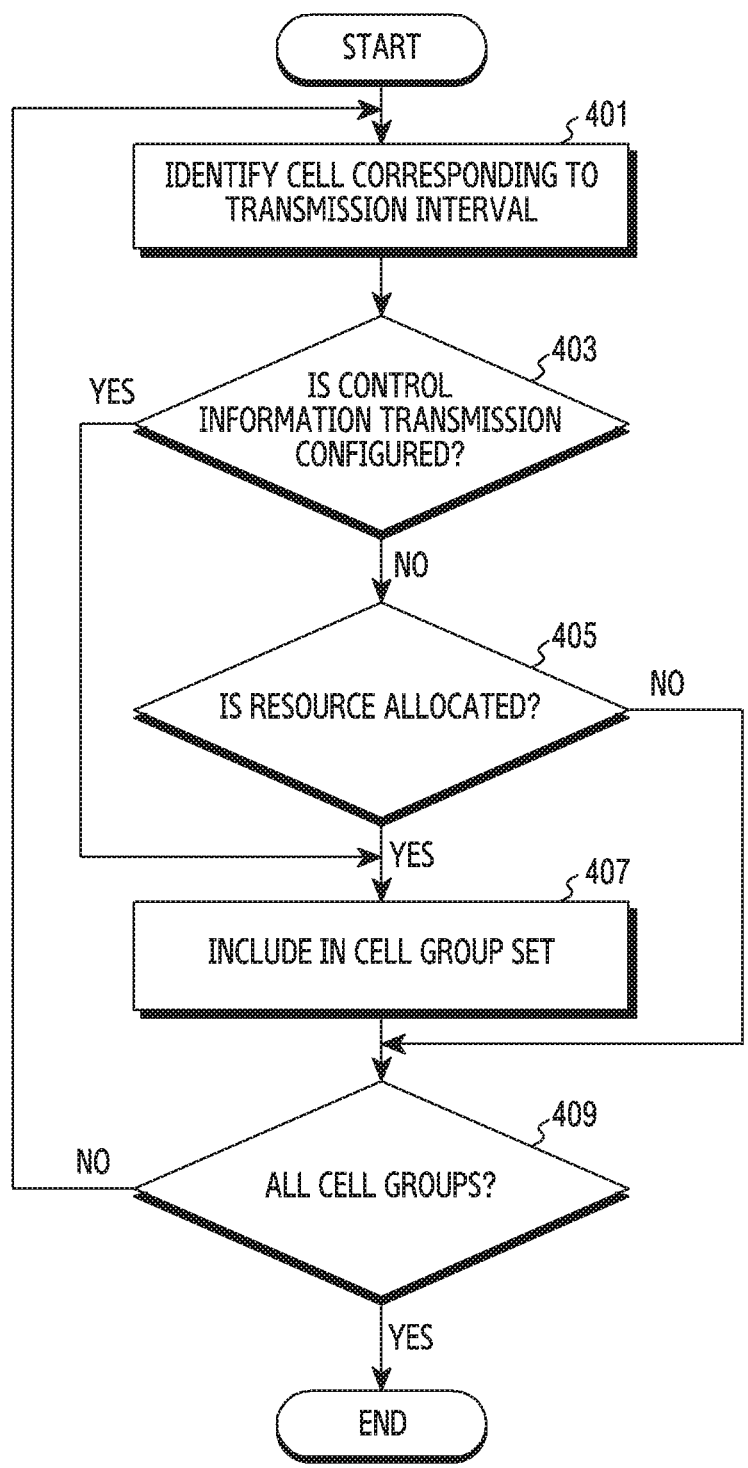
FIG. 4 is a flowchart illustrating an operation of a base station for determining a cell group set in a wireless communication system according to an embodiment of the disclosure.

FIG. 4 is a flowchart illustrating an operation of a base station 110 for determining a cell group set in a wireless communication system according to an embodiment of the disclosure. FIG. 4 is a part of operation 301 of FIG. 3, and the flowchart of FIG. 4 may be understood to be an element of an apparatus (e.g., the base station 110) for performing operations of FIG. 3. The base station 110 is exemplified as a network entity for performing transmission interval-based power distribution. Hereinafter, a cell group set for a transmission interval means a cell scheduled for uplink transmission at the transmission interval. A cell in a cell group set may be referred to as a target cell.

Referring to FIG. 4, in operation 401, the base station 110 may identify a cell corresponding to a transmission interval. The base station 110 may identify a cell in which uplink transmission can be performed at the transmission interval.

In operation 403, the base station 110 may determine whether control information transmission is configured for a cell. When control information transmission is not configured for a corresponding cell, the base station 110 may perform operation 405. When control information transmission is configured for a corresponding cell, the base station 110 may perform operation 407.

In operation 405, the base station 110 may determine whether a resource is allocated to a cell. When a resource is allocated to a corresponding cell, the base station 110 may perform operation 407. When a resource is not allocated to a corresponding cell, the base station 110 may perform operation 409.

In operation 409, the base station 110 may determine whether a target cell determination procedure has been performed for cells in all cell groups. Here, the all cell groups refer to all cell groups for all cells related to multiple-connectivity of the terminal 120 connected to the base station 110. When the target cell determination procedure has been performed, the base station 110 may finish the procedure of determining a cell group set of FIG. 4. When the target cell determination procedure has not been performed, the base station 110 may perform the target cell determination procedure again for the next cell. The base station 110 may perform operation 401 again.

In the embodiment illustrated FIG. 4, operation 403 precedes operation 405. However, operation 405 may precedes operation 403 in another embodiment. This is because PUCCH transmission or PUSCH transmission, in both of which an uplink signal is transmitted, requires power allocation. Further, according to an embodiment of the disclosure, when both PUSCH transmission and PUCCH transmission are performed in a particular cell, the cell may be included in the cell group set of the disclosure.

In FIG. 4, an embodiment of performing recursive operations in units of cell groups is illustrated, but various embodiments of the disclosure are not limited thereto. According to an embodiment of the disclosure, the base station 110 may repeat a recursive operation in units of cells in a particular cell group. For example, the base station 110 may perform a cell group set determination procedure for an $m^{th}$ cell group. The base station 110 may determine whether uplink transmission for an $i^{th}$ cell of the $m^{th}$ cell group can be performed in a corresponding transmission interval. When the uplink transmission for the $i^{th}$ cell of the $m^{th}$ cell group can be performed at the corresponding transmission interval, the base station 110 may determine whether to perform uplink transmission from the $i^{th}$ cell. For example, the base station 110 may determine whether uplink control information is configured for the $i^{th}$ cell or whether a resource for uplink data transmission is allocated to the $i^{th}$ cell. When the uplink control information is configured for the $i^{th}$ cell or the resource for uplink data transmission is allocated to the $i^{th}$ cell, the base station 110 may include the $i^{th}$ cell to the cell group set. Later, the base station may perform the determination procedure again for an $i+1^{th}$ cell. Further, when no uplink transmission can be performed in a corresponding transmission interval for the $i^{th}$ cell of the $m^{th}$ cell group, the base station 110 may perform the determination procedure again for the next $i+1^{th}$ cell. After performing the determination procedure for the $m^{th}$ cell group, the base station 110 may include the $i+1^{th}$ cell to a cell group set for an $m+1^{th}$ cell group.

In FIG. 4, the base station 110 is described as an example of a network entity for determining a cell group set, but various embodiments of the disclosure are not limited thereto. Another base station or a separate apparatus (a separate network entity connected to other base stations) in a multiple-connectivity relationship with the base station 110 may also perform the above-described operations.

Transmission Interval-Based Power Allocation

Figure 5:
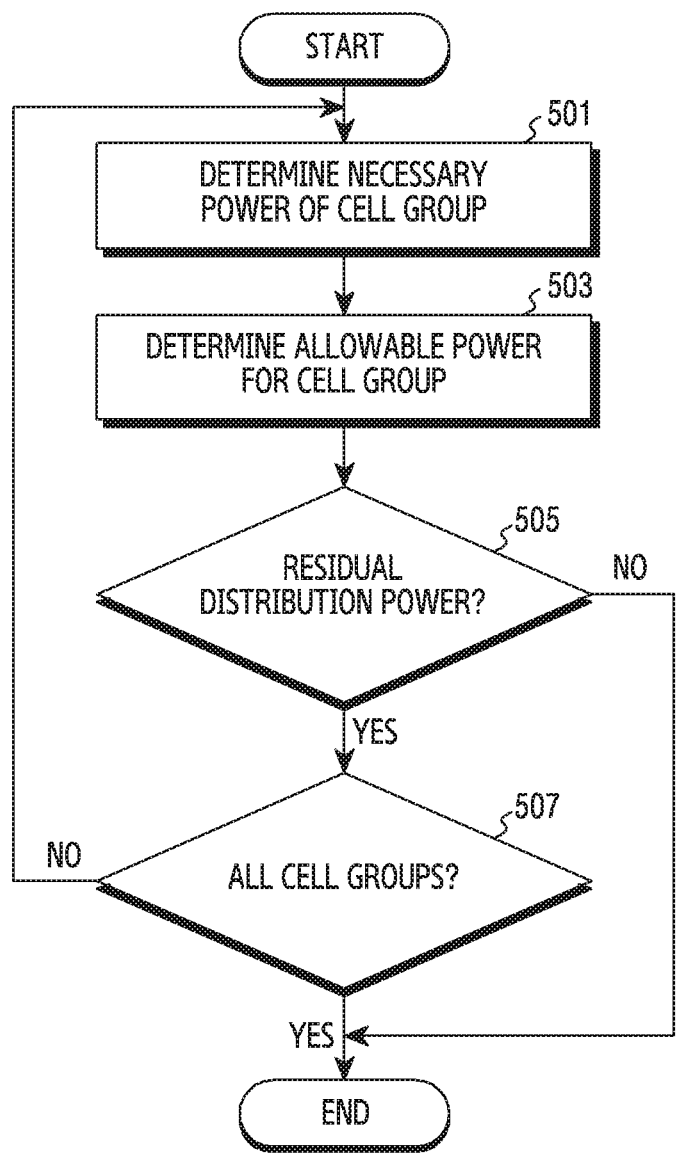
FIG. 5 is a flowchart illustrating an operation of a base station for transmission interval-based power distribution in a wireless communication system according to an embodiment of the disclosure.

FIG. 5 is a flowchart illustrating an operation of a base station 110 for transmission interval-based power distribution in a wireless communication system according to an embodiment of the disclosure. FIG. 5 is a part of operation 303 of FIG. 3, and the flowchart of FIG. 5 may be understood as an element of an apparatus (e.g., the base station 110) for performing operations of FIG. 3. The base station 110 is exemplified as a network entity for performing transmission interval-based power distribution. Hereinafter, a cell group set for a transmission interval means a cell scheduled for uplink transmission at the transmission interval. A cell in a cell group set may be referred to as a target cell. The transmission interval-based power distribution of FIG. 5 means a procedures of distributing the maximum distributable power in units of cell groups according to a designated order.

Referring to FIG. 5, in operation 501, the base station 110 may determine necessary power of a cell group. The cell group means a cell group in a cell group set (e.g., the cell group set in FIG. 4). The necessary power means power required for each of one or more cell of a cell group. For example, when the total sum of power required for three cells in an $m^{th}$ cell group is 13, the necessary power of the $m^{th}$ cell group may be 13. According to an embodiment of the disclosure, the base station 110 may determine whether there is necessary power for an $i^{th}$ cell of the $m^{th}$ cell group. When there is the necessary power, the base station 110 may accumulate the sum of the necessary power and may determine the necessary power of the corresponding cell group. For example, according to operation 507 of FIG. 5 to be described below, the base station 110 may repeatedly calculate power required for the corresponding cell group in the order of "O(1), . . . , O(M)". M may indicate the number of cell groups in a cell group set.

For example, necessary power for each cell may be calculated according to a method below. Here, the calculation method below is a mere example and various calculation methods may be configured to derive the same or similar result.

Necessary power of an arbitrary $i^{th}$ cell in an $m^{th}$ cell group=the maximum transmission power of the $i^{th}$ cell [dBm]− uplink control information power headroom of the $i^{th}$ cell [dB]− the number of resources allocated at the time of configuring the power headroom of the $i^{th}$ cell [dB]+ the number of distributable resources of the $i^{th}$ cell [dB]. Here, the number of distributable resources of the $i^{th}$ cell may be arbitrarily configured within the maximum number of resources distributable at the time of uplink transmission in the corresponding cell.

In operation 503, the base station 110 may determine allowable power for a cell group. The cell group means a cell group of the preceding operation, operation 501. There may be a case in which all power values required due to hardware limits or system requirements of the terminal 120 are used up and a signal may not be transmitted. For example, the allowable power means power actually allowed for transmission among necessary power due to the limitations and requirements (e.g., distributable power, terminal capability, relationships between other cell groups in a multiple-connectivity system). For example, the maximum transmission power of the terminal 120 for all cells (carriers) constituting multiple-connectivity, that is, allowable transmission power for each cell group may be defined as below when distributable power is P_TOT and the maximum transmission power of the terminal 120 for all cells (carriers) in an mlt cell group is P_CG[m].

$O(1)^{st}$ cell group allowable transmission power=MIN (the sum of necessary power of cells in the $O(1)^{st}$ cell group, P_CG[O(1)])

$O(2)^{nd}$ cell group allowable transmission power=MIN (the sum of necessary power of cells in the $O(2)^{nd}$ cell group, P_CG[O(2)], P_TOT−$O(1)^{st}$ cell group allowable transmission power) . . . .

$O(m)^{th}$ cell group allowable transmission power=MIN (the sum of necessary power of cells in the $O(m)^{th}$ cell group, P_CG[O(m)], P_TOT−$(O(1)^{st}$ cell group allowable transmission power + . . . +$O(m−1)^{th}$ cell group allowable transmission power)) . . . .

$O(M)^{th}$ cell group allowable transmission power=MIN (P_TOT−$(O(1)^{st}$ cell group allowable transmission power + . . . +$O(M−1)^{th}$ cell group allowable transmission power), P_CG[O(M)])

In operation 505, the base station 110 may determine whether there is residual distribution power. In other words, the base station 110 may determine whether residual distribution power exists. When the residual distribution power exists, the base station 110 may perform operation 507. When the residual distribution power does not exist, the base station 110 may finish the power distribution procedure.

In operation 507, the base station 110 may determine whether the power distribution procedure has been performed for all cell groups. Here, the all cell groups means all cell groups in a cell group set (e.g., the cell group set of FIG. 4). When the power distribution procedure has been performed for all cell groups, the base station 110 may finish the power distribution procedure of FIG. 5. When the power distribution procedure has not been performed for all cell groups yet, the base station 110 may perform operation 501 of FIG. 5 again. The base station 110 may identify other cell group in the cell group set. The base station 110 may repeatedly perform operations 501 to 507 for the newly identified cell group.

In FIG. 5, the base station 110 is described as a network entity for performing transmission interval-based power distribution, but various embodiments of the disclosure are not limited thereto. Another base station or a separate apparatus (a separate network entity connected to other base stations) in a multiple-connectivity relationship with the base station 110 may also perform the above-described operations.

Figure 6:
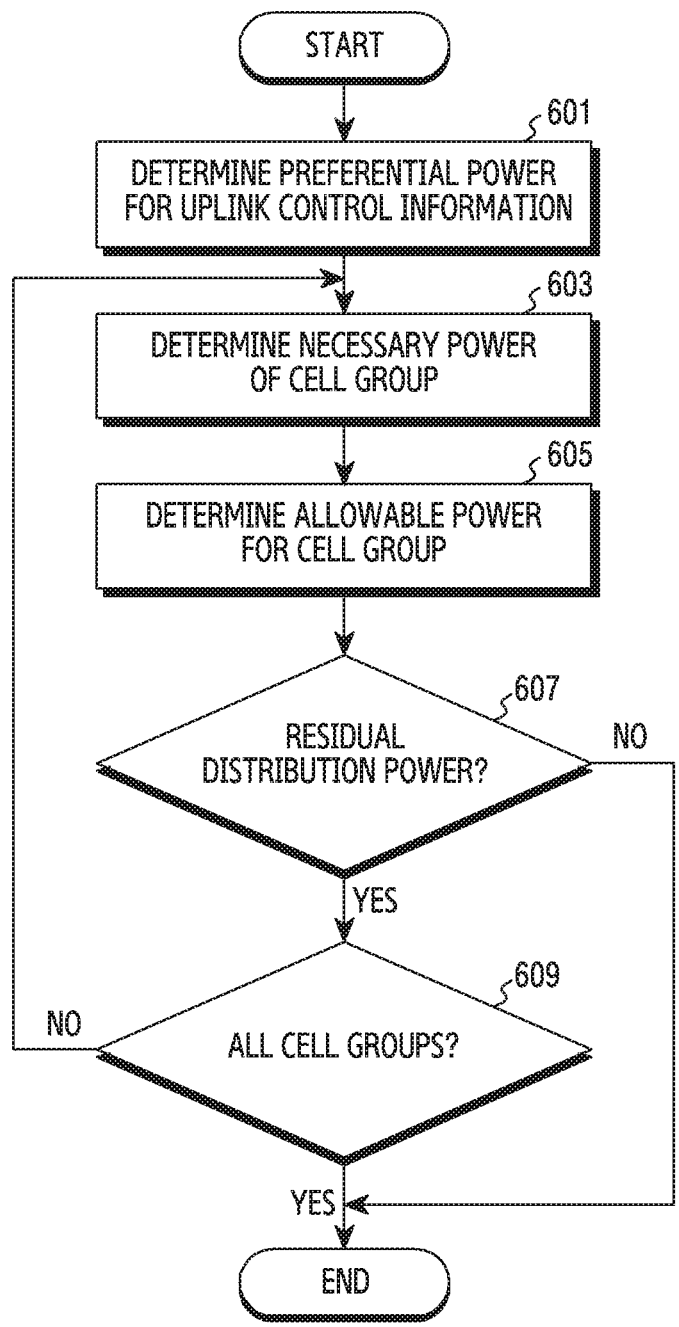
FIG. 6 is a flowchart illustrating an operation of a base station for transmission interval-based power distribution in a wireless communication according to an embodiment of the disclosure.

FIG. 6 is a flowchart illustrating an operation of a base station for transmission interval-based power distribution in a wireless communication according to an embodiment of the disclosure. FIG. 6 is a part of operation 303 of FIG. 3, and the flowchart of FIG. 6 may be understood as an element of an apparatus (e.g., the base station 110) for performing operations of FIG. 6. The base station 110 is exemplified as a network entity for performing transmission interval-based power distribution. Hereinafter, a cell group set for a transmission interval means a cell scheduled for uplink transmission at the transmission interval. A cell in a cell group set may be referred to as a target cell. The transmission interval-based power distribution of FIG. 6 means a procedure of preferentially distributing power for control information transmission over data transmission.

Referring to FIG. 6, in operation 601, the base station 110 may determine preferential power for uplink control information. The preferential power means power preferentially allocated among distributable power. For example, power may be preferentially allocated for uplink control information transmission of a cell group having relatively lower priority over uplink data transmission of a cell group having higher priority. For example, in EN-DC, even though LTE has a higher priority than NR, power may be allocated for NR PUCCH transmission before LTE PUSCH transmission.

The uplink control information may include UCI (e.g., HARQ, CSI, and SR) which is L1 control information. The priority may be determined among the preferential power, that is, among cells for transmitting control information. According to an embodiment of the disclosure, the priority among cells for transmitting control information may be determined based on the priority among cell groups. Further, according to an embodiment of the disclosure, the priority among cells groups for transmitting control information may be determined according to the type (e.g., the HARQ and CSI type) of uplink control information.

The base station 110 may identify one or more cells configured to transmit uplink control information at a transmission interval among all cells of all cell groups of a cell group set for the transmission interval. The base station 110 may determine power (hereinafter, referred to as "control power") for transmitting uplink control information of the identified cell. The base station 110 may determine that the control power corresponds to the preferential power.

In operation 603, the base station 110 may determine necessary power of a cell group. The cell group means a cell group in a cell group set (e.g., the cell group set of FIG. 4). The necessary power means power required for each of one or more cells in a group cell. According to an embodiment of the disclosure, the base station 110 may determine whether there is necessary power for an $i^{th}$ cell of the $m^{th}$ cell group. When there is the necessary power, the base station 110 may accumulate the sum of power to the necessary power and may determine the necessary power of the corresponding cell group. For example, according to operation 609 of FIG. 6 to be described below, the base station 110 may repeatedly calculate power required for the corresponding cell group in the order of "O(1), . . . , O(M)". M may indicate the number of cell groups in a cell group set.

In operation 605, the base station 110 may determine allowable power for a cell group. Based on the distributable power, the preferential power of operation 601, and the necessary power of a cell in operation 603, the base station 110 may determine necessary power of the cell group. In an embodiment of the disclosure, when the maximum transmission power of a terminal for all cell groups (i.e., all carriers) constituting multiple-connectivity is P_TOT and the maximum transmission power of a terminal for all cells (carriers) in an $m^{th}$ cell group is P_CG[m], allowable transmission power for each cell group may be defined as below.

$O(1)^{st}$ cell group allowable transmission power=MIN (MAX (the sum of necessary power of a cell, to which uplink control transmission is configured, in the $O(1)^{st}$ cell group, P_TOT−(the sum of necessary power of a cell, to which uplink control transmission is configured, in the $O(2)^{th}$ cell group + . . . + the sum of necessary power of a cell, to which uplink control transmission is configured, in the $O(M)^{th}$ cell group)), the sum of necessary power of cells in the $O(1)^{st}$ cell group, P_CG[O(1)]). Here, when there is no cell, to which uplink control information transmission is configured, in the $O(1)^{st}$ cell group, the sum of necessary power of the cell, to which uplink control information transmission is configured, in the $O(1)^{st}$ cell group may be 0. Further, the necessary power of cells in the $O(1)^{st}$ cell group may include power required for control information transmission.

$O(2)^{nd}$ cell group allowable transmission power=MIN (MAX (the sum of necessary power of a cell, to which uplink control transmission is configured, in the $O(2)^{nd}$ cell group, P_TOT−$O(1)^{st}$ cell group allowable transmission power−(the sum $O(3)^{rd}$ cell group + . . . + the sum of necessary power of a cell, to which uplink control transmission is configured, in the $O(M)^{th}$ cell group)), the sum of necessary power of cells in the $O(2)^{nd}$ cell group, P_CG[O(2)]) . . . .

$O(m)^{th}$ cell group allowable transmission power=MIN (MAX (the sum of necessary power of a cell, to which uplink control transmission is configured, in the $O(m)^{th}$ cell group, P_TOT−($O(1)^{st}$ cell group allowable transmission power+ . . . +$O(m-1)^{th}$ cell group allowable transmission power)−(the sum of a cell, to which uplink control transmission is configured, in the $O(m+1)^{th}$ cell group + . . . + the sum of necessary power of a cell, to which uplink control transmission is configured, in the $O(M)^{th}$)), the sum of necessary power of cells in the $O(m)^{th}$ cell group, P_CG[O(m)])

$O(M)^{th}$ cell group allowable transmission power=MIN (P_TOT−($O(1)^{st}$ cell group allowable transmission power + . . . +$O(M-1)^{th}$ cell group allowable transmission power), P_CG[O(M)])

In operation 607, the base station 110 may determine whether there is residual distribution power. In other words, the base station 110 may determine whether residual distribution power exists. When the residual distribution power exists, the base station 110 may perform operation 609. When the residual distribution power does not exist, the base station 110 may finish the power distribution procedure.

In operation 609, the base station 110 may determine whether the power distribution procedure has been performed for all cell groups. Here, the all cell groups means all cell groups in a cell group set (e.g., the cell group set of FIG. 4). When the power distribution procedure has been performed for all cell groups, the base station 110 may finish the power distribution procedure of FIG. 6. When the power distribution procedure has not been performed for all cell groups yet, the base station 110 may perform operation 601 of FIG. 6 again. The base station 110 may identify another cell group in the cell group set. The base station 110 may repeatedly perform operations 601 to 609 for the newly identified cell group.

A power distribution example according to the procedure illustrated in FIG. 6 may be as follows. For example, when LTE has a higher priority than NR, and in an EN-DC situation, the case in which, at a particular transmission time point (e.g., 1 TTI), power required for PUCCH transmission of LTE is 4, power required for PUSCH transmission of LTE is 5, power required for PUCCH transmission of NR is 5.1, and power required for PUSCH transmission of NR is 3 may be assumed. When the entire distributable power is 10, power of 4, power of 5.1, power of 0.9, and power of 0 may be allocated for PUCCH transmission of LTE, PUCCH transmission of NR, PUSCH transmission of LTE, and PUSCH transmission of NR, respectively.

In another example, the case in which each cell group has a higher priority in the order of a first cell group, a second cell group, and a third cell group, and, at a particular transmission time point (e.g., 1 TTI), power required for control signal transmission of the first cell group is 2, power required for data signal transmission of the first cell group is 3, power required for control signal transmission of the second cell group is 4, power required for data signal transmission of the second cell group is 9, power required for control signal transmission of the third cell group is 6, power required for data signal transmission of third cell group is 7, and the entire distributable power is 20 may be assumed. The base station 110 may determine preferential power to be 12. Later, the residual distributable power 8 may be sequentially distributed to the cell groups. The base station 110 may allocate power of 3, power of 5, and power of 0 for data transmission of the first cell group, data transmission of the second cell group, and data transmission of the third cell group, respectively.

As described above, in determining allowable transmission power of a cell group of FIG. 6, the base station 110 calculates allowable transmission power of each cell group, considering power required for cell groups and also preferentially considering power required for a cell to which uplink control information transmission is configured over a cell to which uplink control information transmission is not configured. The power is preferentially allocated for control information, and thus the case in which no control information is transmitted may be prevented even though a cell group has the lower priority. No transmission of control information may affect uplink transmission (e.g., PUSCH transmission) at the next transmission interval. Relatively more important information may be transmitted first, whereby the efficiency for wireless channel management may be increased.

In FIG. 6, uplink control information transmission (e.g., PUCCH transmission) and uplink data transmission (e.g., PUSCH transmission) are separately described, but the disclosure may be applied identically to the case in which uplink control information transmission and uplink data transmission are simultaneously performed in one cell (e.g., the case in which PUSCH and PUCCH transmission are simultaneously performed in one cell). Since RB allocation for corresponding traffic is required, power may be allocated according to operation 605 of FIG. 6.

An example of control information is described, but the disclosure is not limited thereto. Uplink power may be preferentially allocated to an urgent service or urgent traffic even in the case of non-uplink control information transmission.

An example of uplink control information is described in FIG. 6, but the disclosure is not limited thereto. Uplink power may be preferentially allocated to an urgent service or urgent traffic even in the case of non-uplink control information transmission. For example, uplink power may be preferentially allocated to a cell in which control information transmitted on L2 is transmitted, other than general data traffic. For example, whether to preferentially allocate power for a corresponding cell may be determined according to a logical channel ID value of a MAC CE. The power may be preferentially allocated to a cell in which a PHR is transmitted over a cell in which general uplink data is transmitted.

When a cell to which uplink control transmission is configured is not included in a cell group set, preferential power is determined to be 0, and thus the power distribution procedure of FIG. 6 may be the same as the power distribution procedure of FIG. 5.

Figure 7:
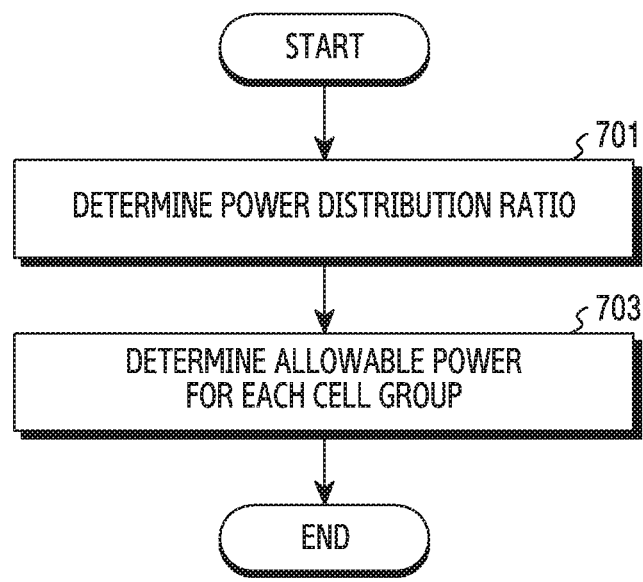
FIG. 7 is a flowchart illustrating an operation of a base station for transmission interval-based power distribution in a wireless communication system according to an embodiment of the disclosure.

FIG. 7 is a flowchart illustrating an operation of a base station 110 for transmission interval-based power distribution in a wireless communication system according to an embodiment of the disclosure. FIG. 7 is a part of operation 303 of FIG. 3, and the flowchart of FIG. 7 may be understood as an element of an apparatus (e.g., the base station 110) for performing operations of FIG. 7. The base station 110 is exemplified as a network entity for performing transmission interval-based power distribution. Hereinafter, a cell group set for a transmission interval means a cell scheduled for uplink transmission at the transmission interval. A cell in a cell group set may be referred to as a target cell. The transmission interval-based power distribution of FIG. 7 means a procedure of distributing power to each cell group according to a designated ratio.

Referring to FIG. 7, in operation 701, the base station 110 may determine a power distribution ratio. The power distribution ratio means the ratio between power which can be allocated to each of cell groups in a cell group set (e.g., the cell group set of FIG. 4).

According to various embodiments of the disclosure, the power distribution ratio may be determined based on the ratio of necessary power of each of cell groups. For example, in the case of EN-DC, the power distribution ratio may mean the ratio between LTE necessary power ($P_{LTE}$) and NR necessary power ($P_{NR}$). In some embodiments of the disclosure, the power distribution ratio may be determined based on buffer information of each cell. For example, when the EN-DC is configured for the terminal 120, the power distribution ratio may be determined based on the total size of data stored in an LTE buffer and the total size of data stored in an NR buffer.

The power distribution ratio may be determined based on conditions in addition to the necessary power of a cell group. In some embodiments of the disclosure, the power distribution ratio may be determined based on a PHR of each cell group. For example, when the EN-DC is configured for the terminal 120, the terminal 120 may transmit a PHR for LTE cells and a PHR for NR cells (e.g., multiple entry PHR) to the base station 110. The base station 110 may identify a PHR of each cell of each cell group based on the received PHR. The base station 110 may determine the power distribution ratio based on the PHR. In some other embodiments of the disclosure, the power distribution ratio may be determined based on the number of active cells of each cell group. For example, when the EN-DC is configured for the terminal 120, the case in which one uplink cell is activated in LTE and two uplink cells are activated in NR may be assumed. The base station 110 may determine the power distribution ratio based on a weight value of 1:2. This is because allocating power preferentially to the NR may be efficient for smoothly performing CA. According to an embodiment of the disclosure, through a MAC CE, according to the succession of activation/deactivation of a cell in a particular cell group, the base station 110 may recalculate the power distribution ratio. In the case of a hibernated cell, since no uplink transmission is performed, the hibernated cell may be treated the same as a deactivated cell.

According to various embodiments of the disclosure, the power distribution ratio may be recalculated for each transmission interval. Whenever determining power of uplink transmission for a transmission interval, the base station 110 may determine the power distribution ratio again based on currently given information (e.g., a power allocation history, a buffer state report, the number of activated cells, and a power headroom report). By determining the power distribution ratio again for each transmission interval, power may be more effectively distributed when multiple cell groups are simultaneously operated.

According to various embodiments of the disclosure, the power distribution ratio may be recalculated whenever a particular event occurs. For example, the base station 110 may recalculate the power distribution ratio whenever a PHR is reported from the terminal. Further, for example, the base station 110 may recalculate the power distribution ratio whenever a cell is activated/deactivated/hibernated in the terminal.

In operation 703, the base station 110 may determine allowable power for each cell group. The base station 110 may identify distributable power. The base station 110 may determine allowable power for each cell group based on cell group-specific maximum power, the power distribution ratio, and the entire distributable power. The base station 110 may determine allowable power of each cell in the order from the $O(1)^{st}$ cell group to the $O(M)^{th}$ cell group according to the cell group-specific maximum power, the distributable power, and the power distribution ratio of operation 701. In one embodiment of the disclosure, when the maximum transmission power of a terminal for all carriers constituting multiple-connectivity, i.e., the distributable power, is P_TOT, the maximum transmission power of a terminal for all carriers in each $m^{th}$ group is P_CG[m], and the ratio of the entire allowable transmission power of each group is P_RATIO[m], allowable transmission power for each cell group may be defined as below.

$O(1)^{st}$ cell group allowable transmission power=MIN (P_TOT*P_RATIO[O(1)], P_CG[O(1)])

$O(2)^{nd}$ cell group allowable transmission power =MIN (P_TOT*P_RATIO[O(2)], P_CG[O(2)], P_TOT−O(1)$^{st}$ cell group allowable transmission power) . . . .

$O(m)^{th}$ cell group allowable transmission power=MIN (P_TOT*P_RATIO[O(m)], P_CG[O(m)], P_TOT−(O(1)$^{st}$ cell group allowable transmission power + . . . +O(m−1)$^{th}$ cell group allowable transmission power)) . . . .

$O(M)^{th}$ cell group allowable transmission power=MIN (P_TOT−(O(1)$^{st}$ cell group allowable transmission power + . . . +O(M−1)$^{th}$ cell group allowable transmission power)), P_CG[O(M)])

Whenever sequentially distribution power for each cell group, the base station 110 may determine whether residual distribution power remains. When it is determined that there is residual distribution power, the base station 110 may perform a power distribution procedure, based on the power distribution ratio reflecting a proportion to be distributed to the next cell group. Alternatively, when there is no residual distribution power, the base station 110 may finish the power distribution procedure. In the latter case, the distribution power for the next cell groups may be 0.

The allowable power is allocated to each cell group not according to a fixed ratio, but the allowable power is allocated by sequentially excluding actual allowable power determined according to the ratio, and thus the probability of occurrence of the case in which power is not used may decrease. By decreasing the probability of occurrence of the case in which power is not used, power actually usable in the terminal 120 may increase and, accordingly the power efficiency may increase. In addition, the distributable power is not distributed across the cell group according to the cell group priority, but is distributed according to a particular ratio, and thus the case in which power repeatedly fails to be distributed and uplink transmission is not performed may be prevented.

In FIG. 7, the base station 110 is described as a network entity for performing transmission interval-based power distribution, but various embodiments of the disclosure are not limited thereto. Another base station or a separate apparatus (a separate network entity connected to other base stations) in a multiple-connectivity relationship with the base station 110 may also perform the above-described operations.

Figure 8:
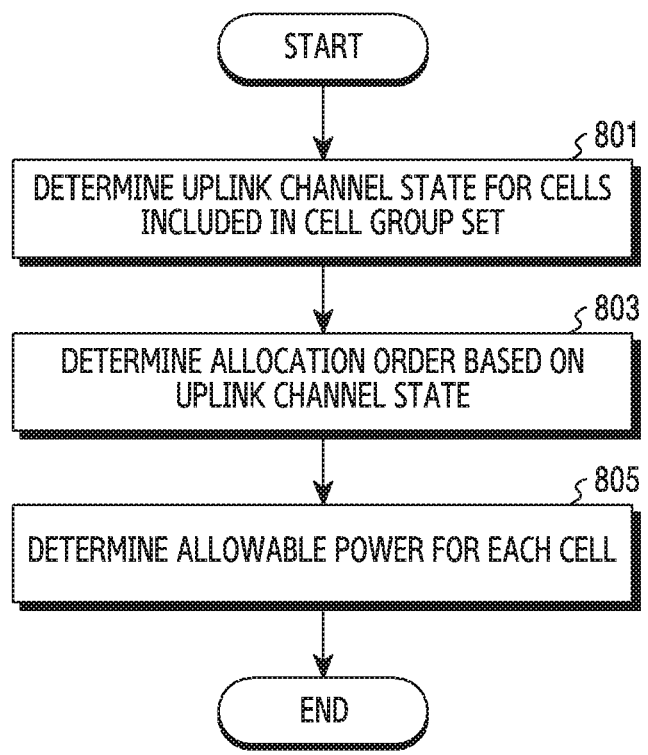
FIG. 8 is a flowchart illustrating an operation of a base station for transmission interval-based power distribution in a wireless communication system according to an embodiment of the disclosure.

FIG. 8 is a flowchart illustrating an operation of a base station 110 for transmission interval-based power distribution in a wireless communication system according to an embodiment of the disclosure. FIG. 8 is a part of operation 303 of FIG. 3, and the flowchart of FIG. 8 may be understood as an element of an apparatus (e.g., the base station 110) for performing operations of FIG. 8. The base station 110 is exemplified as a network entity for performing transmission interval-based power distribution. Hereinafter, a cell group set for a transmission interval means a cell scheduled for uplink transmission at the transmission interval. A cell in a cell group set may be referred to as a target cell. The transmission interval-based power distribution of FIG. 8 means a procedure of distributing the entire distributable power according to the cell-specific priority.

Referring to FIG. 8, in operation 801, the base station 110 may determine an uplink channel state for cells included in a cell group set.

The base station 110 may identify cells included in a cell group set. For example, the total number of cells may be L. The base station 110 may acquire information on the uplink channel state for each cell. Here, the uplink channel state may include at least one of the uplink channel quality (e.g., the signal strength, the interference ratio, and whether multiple paths are acquired), the type of an uplink channel (e.g., a PUCCH and a PUSCH), and beam information related to uplink transmission (e.g., a beam in a QCL relationship or the channel quality of the corresponding beam).

In operation 803, the base station 110 may determine an allocation order based on the uplink channel state. In some embodiments of the disclosure, the base station 110 may determine the allocation order based on the uplink channel quality. For example, the base station 110 may preferentially consider required power in the order of cells having the better uplink channel quality among cells in M cell groups. Further, in some embodiments of the disclosure, the base station 110 may determine the allocation order based on the type of an uplink channel. The base station 110 may determine a cell-specific priority metric based on whether a cell group of a corresponding cell is LTE or NR, or whether an uplink channel of a corresponding cell is an NR PUCCH or an NR PUSCH, and may determine the allocation order for all cells according to the priority metrics of all cells. Further, in some embodiments of the disclosure, the base station 110 may determine the allocation order based on timing advance (TA) (or a timing advance group (TAG)) of each cell. This is because as the TA value becomes larger, the distance between the terminal and the cell (the base station) becomes relatively longer and the terminal becomes closer to the cell edge. The closer to the cell edge, the greater the need for allocating more power and enabling an uplink signal of the terminal to stably arrive at the base station.

In operation 805, the base station 110 may determine allowable power for each cell. The base station 110 may determine allowable power for each cell according to the allocation order determined in operation 803. The base station 110 may sequentially determine allowable power of each cell from the distributable power according to the allocation order. In the case of an $I^{th}$ cell according to the allocation order, the base station 110 may determine the allowable power of each cell based on the currently distributable power remaining after excluding allowable power for cells up to $(I-1)^{th}$ cells, necessary power for the $I^{th}$ cell, and the maximum power for a cell group of the $I^{th}$ cell. In one embodiment of the disclosure, when the maximum transmission power of a terminal for all cell groups (all carriers) constituting multiple-connectivity, i.e., the distributable power, is P_TOT and the maximum transmission power of a terminal for all carriers in each $m^{th}$ group is P_CG[m], allowable transmission power for each cell group may be defined as below.

K $(1)^{st}$ cell allowable transmission power=MIN (distributable power, P_CG (the cell group to which the first cell belongs), allowable transmission power of the cell group to which the first cell belongs+$1^{st}$ cell necessary power)

K $(2)^{nd}$ cell allowable transmission power=MIN (distributable power-K $(1)^{st}$ cell allowable transmission power, P_CG (the cell group to which the $2^{nd}$ cell belongs), allowable transmission power of the cell group to which the second cell belongs+$2^{nd}$ cell necessary power) . . . .

K $(L)^{th}$ cell allowable transmission power=MIN (distributable power-K $(1)^{st}$ cell allowable transmission power-K $(2)^{nd}$ cell allowable transmission power, . . . , -K $(L-1)^{th}$ cell allowable transmission power Whenever sequentially distributing power for each cell, the base station 110 may determine whether residual distribution remains. When there is residual distribution power, the base station 110 may perform a power distribution procedure, based on the power distribution ratio reflecting necessary power of the next cell group. Alternatively, when there is no residual distribution power, the base station 110 may finish the power distribution procedure. In the latter case, the distribution power for the next cell groups may be 0.

In FIG. 8, it is described that the allocation order is determined based on the channel state, but embodiments of the disclosure are not limited thereto. According to an embodiment of the disclosure, the allocation order may be determined in the order of activation of cells of a cell group set. In addition, according to an embodiment of the disclosure, the allocation order may be determined according to a resource allocation size (e.g., the number of RBs and a transport block size (TBS)). Further, according to an embodiment of the disclosure, the allocation order may be determined based on a cell index (e.g., SCellindex).

In FIG. 8, the base station 110 is described as a network entity for performing transmission interval-based power distribution, but various embodiments of the disclosure are not limited thereto. Another base station or a separate apparatus (a separate network entity connected to other base stations) in a multiple-connectivity relationship with the base station 110 may also perform the above-described operations.

Real-Time/Non-Real Time Power Allocation Signaling

Figure 9A:
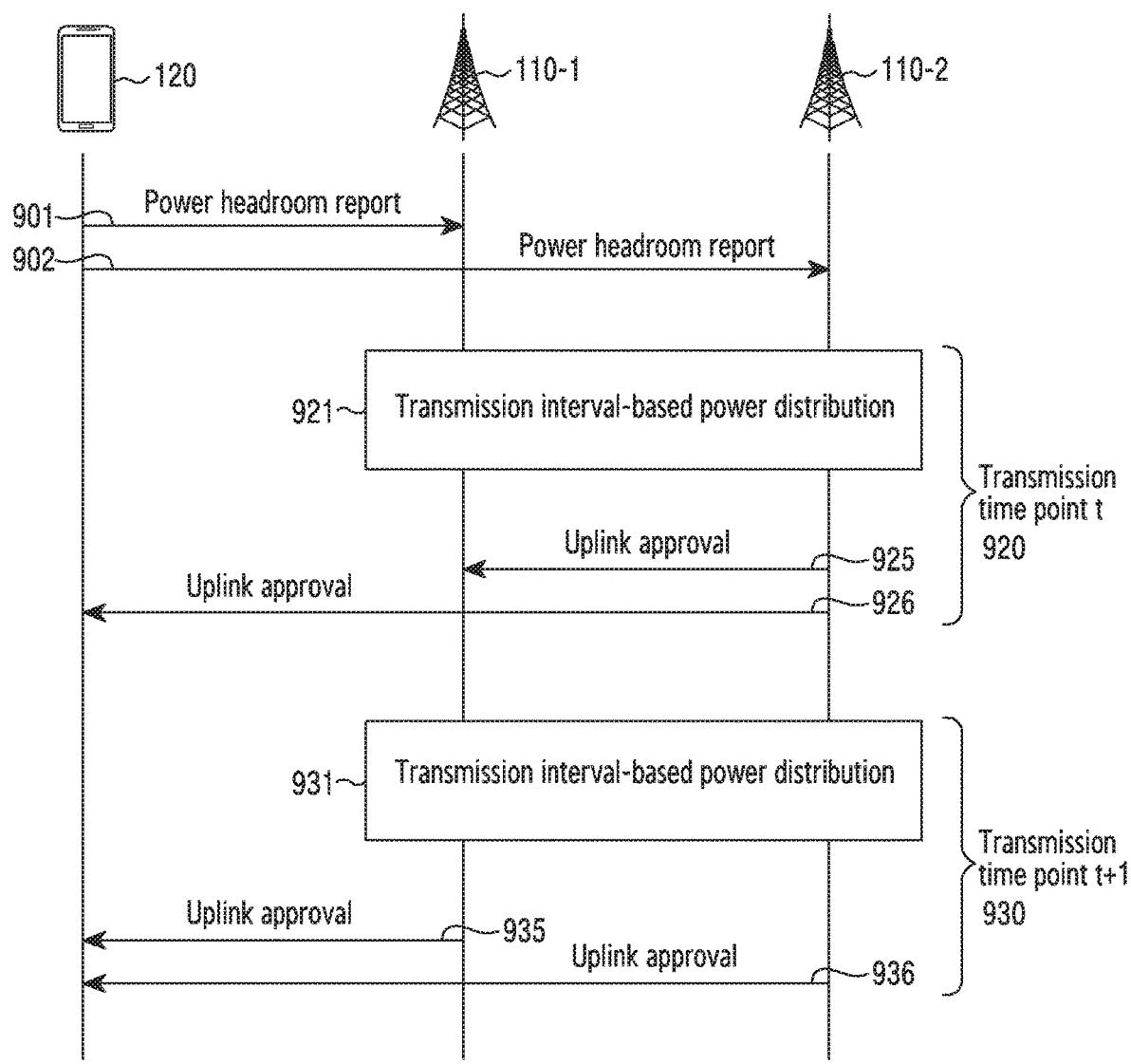
FIG. 9A illustrates signaling between a base station and a terminal for power allocation in a wireless communication system according to an embodiment of the disclosure.

FIG. 9A illustrates signaling between base stations 110-1 and 110-2 and a terminal 120 in a wireless communication system according to an embodiment of the disclosure. The power allocation of FIG. 9A corresponds to power allocation based on real-time power distribution. A real-time terminal transmission power distribution control operation is performed for one or more cells in M (M>1) cell groups for performing uplink transmission at a transmission time point t. In FIG. 9A, the case in which the terminal 120 is connected to a first base station 110-1 and a second base station 110-2 in dual-connectivity is described.

Referring to FIG. 9A, the terminal 120 may perform a power headroom report (PHR). The terminal 120 may transmit the PHR to each of the base stations in multiple-connectivity. For example, in the case of dual-connectivity, in operation 901, the terminal 120 may transmit a dual-connectivity PHR (or a multiple entry PHR) to the first base station 110-1. In operation 902, the terminal 120 may transmit a dual-connectivity PHR (or a multiple entry PHR) to the second base station 110-2. The same information may be transmitted to the base stations in multiple-connectivity.

In operation 921, the base station 110-1 or the base station 110-2 may perform transmission interval-based power distribution. According to an embodiment of the disclosure, the base station 110-1 and the base station 110-2 may exchange information on a cell group, required for terminal transmission power control. The exchange may include the operations of: transmitting information on a cell group of the first base station 110-1 to the second base station 110-2 by the first base station 110-1 only; transmitting information on a cell group of the second base station 110-2 to the first base station 110-1 by the second base station 110-2 only; or exchanging information on a cell group of each of the base stations by both the first base station 110-1 and the second base station 110-2.

At least one of the first base station 110-1 and the second base station 110-2 may determine a cell group set based on the information on the cell group. The cell group set means a set of cell groups including a cell in which uplink transmission is to be performed at a particular transmission time point t 920 (e.g., the $t^{th}$ TTI). According to an embodiment of the disclosure, each of the first base station 110-1 and the second base station 110-2 may determine a cell group to which uplink transmission is configured at the particular transmission time point t 920 and then may exchange the determined cell group information with each other. Further, according to an embodiment of the disclosure, the first base station 110-1 is a master base station and the second base station 110-2 may transmit a cell group set of the second base station 110-2 at the particular transmission time point t 920 to the first base station 110-1. Later, the first base station 110-1 may perform transmission interval-based power distribution procedure.

Specifically, each cell in the M cell groups, in which uplink transmission may be performed at a particular transmission time point t 920 and resource allocation for the uplink transmission is performed at the particular transmission time point t 920, may determine a cell group set including a cell which is subject to necessary power calculation for each subsequent cell and is subject to allowable transmission power calculation for each cell group, based on resource allocation information of the uplink transmission for each cell in each cell group, the information being acquired by an information processor (e.g., implementation in the base station) of each cell. The cell group set may include cells in which uplink transmission is performed at a particular transmission time point and may be referred to as a "simultaneous operation cell group". The cell group may include a cell to which uplink control information transmission is configured among cells in which uplink transmission can be performed at a particular transmission time point t 920, or a cell in which resource allocation for uplink transmission is performed at a particular transmission time point t 920 among cells to which uplink control information transmission is not configured.

According to an embodiment of the disclosure, a cell in the cell group set may calculate cell-specific necessary power for cells which is subject to be determined, based on power headroom report information received from another base station, uplink resource allocation information used to calculate a power headroom of a terminal, and information on the maximum allocable resource of each cell.

At least one of the first base station 110-1 and the second base station 110-2 may perform power distribution for each cell group based on the cell group set. For example, the base station 110-1 may determine transmission power to be allocated to a first cell group and transmission power to be allocated to a second cell group based on information on cell group(s) of the first base station 110-1 and information on cell group(s) of the second base station 110-2. The first base station 110-1 may transmit distribution information, i.e., information on transmission power to be allocated to the second cell group, to the second base station 110-2. In another example, the operation of the above-described example may be performed by the second base station 110-2 instead of the first base station 110-1.

In operation 925, the first base station 110-1 may transmit an uplink approval to the terminal 120. In operation 926, the second base station 110-2 may transmit an uplink approval to the terminal 120. In the disclosure, the power allocation may be performed based on the number of RBs. In this case, in the multiple-connectivity system, since a scheduler may be independently configured in units of cell groups, the uplink approval may be individually transmitted to the terminal 120. The resource allocation information included in the uplink approval may correspond to the result of the power distribution. For example, when the power allocated to a cell group of the first base station 110-1 is twice the power allocated to a cell group of the second base station 110-2, the resource allocation information of the uplink approval in operation 925 may indicate a data size twice as large as that of the uplink approval in operation 926. According to an embodiment of the disclosure, the data size may be represented by the number of RBs. Further, according to another embodiment of the disclosure, the data size may be represented by the TBS.

The first base station 110-1, the second base station 110-2, and the terminal 120 may repeatedly perform the transmission interval-based power distribution procedure at the next transmission time point (t+1) 930. Since operations 931, 935, and 936 correspond to operations 921, 925, and 926, respectively, the similar or same description for operations 921, 925, and 926 may be applicable to operations 931, 935, and 936, respectively. Accordingly, by performing power distribution for every TTI, the base station 110 may maximize the effect of dynamic power sharing (DPS). By allocating a resource to a terminal, making the most of extra power, the throughput may be increased and this may lead to the increase of a cell capacity in general.

According an embodiment of the disclosure, in performing the real-time terminal transmission power distribution control operation, each base station may an include inter-cell-group information sharing unit. The inter-cell-group information sharing unit may receive information on a cell group of another base station. For example, the information transmitted to the inter-cell-group information sharing unit may include: information on whether the terminal supports dynamic power distribution; information on whether uplink transmission may be performed at each transmission time point for cells in each cell group; information on whether a resource is allocated for uplink transmission at a transmission time point t; information on a power headroom report received by a cell in each cell group; information on a resource which has been allocated for uplink transmission, the resource information being subjected to the terminal power headroom calculation; and information on the maximum distributable resource of each cell.

According to an embodiment of the disclosure, in performing a real-time terminal transmission power distribution control operation, each base station may include an information processor in units of cell groups or cells. The information managed by the information processor may include: information on whether the terminal supports dynamic power distribution; information on whether uplink transmission may be performed at each transmission time point for cells in each cell group; information on whether a resource is allocated for uplink transmission at a transmission time point t; information on a power headroom report received by a cell in each cell group; information on a resource which has been allocated for uplink transmission, the resource being subjected to the terminal power headroom calculation; and information on the maximum distributable resource of each cell.

According to an embodiment of the disclosure, in an example illustrated in FIG. 9A, an inter-cell-group information sharing unit of a first cell group (i.e., an inter-cell-group information sharing unit of the first base station 110-1) may transmit, to an inter-cell-group information sharing unit of another cell group (i.e., an inter-cell-group information sharing unit of the second base station 110-2), the maximum transmission power of a terminal, which is configured to a terminal via a radio resource signal, for all cells in each cell group, and the maximum transmission power of a terminal for all cells in the M cell groups.

As in operations 901 and 902 in FIG. 9A, when calculating necessary power of each cell, a base station according to various embodiments may determine the necessary power based on a power headroom report. In this case, whenever the information processor of each cell in M cell groups receives a power headroom report from a terminal, a corresponding base station may transmit the received power headroom report information and uplink resource allocation information used to calculate the power headroom report of the terminal to an inter-cell-group information sharing unit of a base station which manages a corresponding cell group. According to an embodiment of the disclosure, when a terminal reports based on the real uplink transmission for a cell, to which uplink transmission is configured, in each cell group, the power headroom report information may include power headroom information and the maximum power of each cell for a corresponding cell. According to another embodiment of the disclosure, when a terminal reports based on the virtual uplink transmission for a cell, to which uplink transmission is configured, in each cell group, the power headroom report information may include only power headroom information without maximum power information of each cell. The inter-cell-group information sharing unit having received the power headroom report information between cells in the cell group and the uplink resource allocation information used to calculate the power headroom report of the terminal may transmit, to an inter-cell-group information sharing unit of another base station, the received power headroom report information and the uplink resource allocation information used to calculate the power headroom report of the terminal.

A terminal transmission power controller of each cell in M cell groups may determine a target cell for simultaneously performing an operation of dynamically controlling uplink transmission power at a certain transmission time point t for a terminal supporting dynamic power distribution, based on the information on whether uplink transmission for each cell of each cell group is performed, acquired by the information processor.

According to an embodiment of the disclosure, when the first base station 110-1 performs power distribution, in order to preferentially consider power required for a particular cell or cell group among all cells in M cell groups and support an operation of determining allowable power between cell groups, the inter-cell-group information sharing unit of the first cell group may determine a dynamic power distribution management mode and transmit the same to an inter-cell-group information sharing unit of another cell group.

The power distribution may be performed for the real-time terminal transmission power control as described in FIGS. 5 to 8. Hereinafter, each of the above-described four power distribution methods is referred to and described as a dynamic power distribution mode. An apparatus for performing power distribution may perform power allocation for each cell group based on at least one of four dynamic power distribution modes. Here, based on the necessary power of each cell, allowable transmission power of a cell group may be individually calculated according to dynamic power distribution management modes between cell groups.

The order between cell groups for determining the allowable transmission power between M cell groups may be determined in the order of O(1), . . . , O(M). In an embodiment of the disclosure, when dual-connectivity between a 4G cell group and a 5G cell group is configured, the 4G cell group is configured to be O(1) and the 5G cell group is configured to be O(M) so that the allowable transmission power may be preferentially determined for the 4G cell group over the 5G cell group.

A first dynamic power distribution mode corresponds to a mode in which allowable power is preferentially determined for a corresponding cell group in the order of the above-mentioned O(1), . . . , O(M), starting from an O(1)$^{st}$ cell group. In an embodiment of the disclosure, in dual-connectivity between two cell groups, wherein a 4G cell group is configured to be O(1) and a 5G cell group is configured to be O(2), each cell belonging to a simultaneous operation cell group may determine allowable transmission power between cell groups in the order of calculating allowable transmission power of the 4G cell group first so as to secure the maximum power required for cells in the 4G cell group within limited transmission power of a terminal and then calculating allowable transmission power of the 5G cell group. In the embodiment of the disclosure, the allowable transmission power of the 5G cell group may be limited depending on the allowable transmission power of the 4G cell group within the limited transmission power of a terminal.

A second dynamic power distribution mode corresponds to a mode in which allowable power is preferentially considered for a corresponding cell group in the order of the above-mentioned O(1), . . . , O(M), starting from an O(1)$^{st}$ cell group and power required for a cell to which uplink control information transmission is configured is also preferentially considered over a cell to which no uplink control information transmission is configured. In an embodiment of the disclosure, in dual-connectivity between two cell groups wherein a 4G cell group is configured to be O(1) and a 5G cell group is configured to be O(2), each cell belonging to a simultaneous operation cell group may determine power required for a cell group in the order of an uplink control information transmission configured cell in the 4G cell group, an uplink control information transmission configured cell in the 5G cell group, an uplink control information transmission non-configured cell in the 4G cell group, and an uplink control information transmission non-configured cell in the 5G cell group. In the embodiment of the disclosure, the allowable power of the 4G cell group may be limited depending on the necessary transmission power of a cell, to which uplink transmission is configured, in the 5G cell group within the limited transmission power of a terminal.

A third dynamic power distribution mode corresponds to a mode in which power is distributed based on a certain ratio for each cell group in the order of the above-mentioned O(1), . . . , O(M), starting from an O(1)$^{st}$ cell group.

A fourth dynamic power distribution mode corresponds to a mode in which required power is preferentially considered for a cell in the total M cell groups in a certain order. In an embodiment of the disclosure, the certain order between cells may be determined in the order of having better uplink channel quality.

Figure 9B:
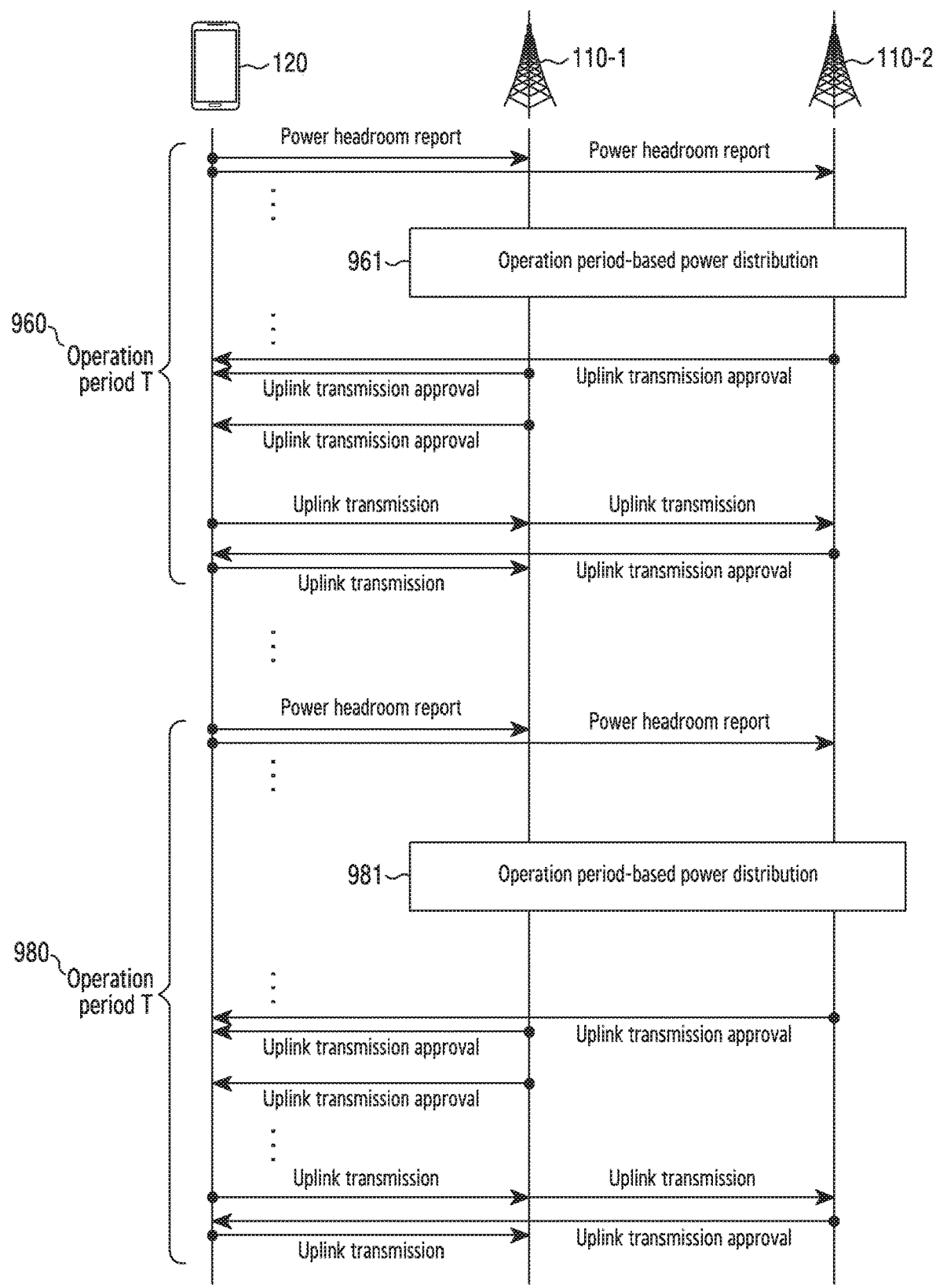
FIG. 9B illustrates signaling between a base station and a terminal for power allocation in a wireless communication system according to an embodiment of the disclosure.

FIG. 9B illustrates signaling between base stations 110-1 and 110-2 and a terminal 120 in a wireless communication system according to an embodiment of the disclosure. The power allocation of FIG. 9B corresponds to power allocation based on periodical power distribution. A periodical terminal transmission power distribution control operation is performed for one or more cells in M (M>1) cell groups for performing uplink transmission at an operation period T. In FIG. 9B, the terminal 120 is connected to a first base station 110-1 and a second base station 110-2 in dual-connectivity.

Referring to FIG. 9B, the terminal 120 may perform a power headroom report (PHR). The terminal 120 may transmit the PHR to each of the base stations in multiple-connectivity. For example, in the case of dual-connectivity, the terminal 120 may transmit a dual-connectivity PHR (or a multiple entry PHR) to the first base station 110-1. The terminal 120 may transmit a dual-connectivity PHR (or a multiple entry PHR) to the second base station 110-2. The same information may be transmitted to the base stations in multiple-connectivity.

Unlike FIG. 9A, in FIG. 9B, the power distribution may be performed based on an operation period. For example, the first base station 110-1 and the second base station 110-2 may identify cells in which uplink transmission is performed and may determine a cell group set, not in real-time but at a designated interval (e.g., multiple TTIs). In other words, a cell being subjected to the power distribution calculation may be determined again in the cell group set, not in real-time but based on the operation period. The first base station 110-1 or the second base station 110-2 may perform first operation period-based power distribution 961 at a first operation period T 960. The first base station 110-1 or the second base station 110-2 may identify cells in which uplink transmission is performed, at the first operation period. In other words, unlike FIG. 9A, the cell group set may include not only a cell in which uplink transmission performed at a particular transmission time point but also cells in which uplink transmission is performed within a designated period. Within the operation period, flexible allocation may be performed for each cell group, whereby more flexible resource allocation may be performed in response to a sudden channel change. Later, at a second operation period T 980, second operation period-based power distribution 981 may be performed.

FIG. 9B illustrates a method of distributing power according to an operation period T including two or more TTIs, and the description for FIG. 9A may be applied to operations (e.g., a power headroom report and an uplink approval) other than the operation of determining the cell group set in the same or similar manner.

In performing the non-real-time terminal transmission power distribution control operation, information transmitted to an inter-cell-group information sharing unit between cell groups of a base station may include: information on whether the terminal supports dynamic power distribution; information on whether uplink transmission may be performed at each transmission time point for cells in each cell group; and information on the maximum distributable resource of each cell. Further, in performing the non-real-time terminal transmission power distribution control operation, the information managed by the information processor of each cell in a cell group of a base station may include: information on whether the terminal supports dynamic power distribution; information on whether uplink transmission may be performed at each transmission time point for cells in each cell group; information on a power headroom report received by each cell in the same cell group; information on a resource which has been allocated for uplink transmission, the resource being subjected to the terminal power headroom calculation; and information on the maximum distributable resource of each cell. Further, the information transmitted to the information processor of each cell in the second cell group for performing the non-real-time terminal transmission power distribution control operation may include: information on whether uplink transmission may be performed at each transmission time point for cells in each cell group; information on a power headroom report received by each cell; uplink resource allocation information used when the terminal calculates a power headroom; and information on the maximum distributable resource of each cell.

The inter-cell-group information sharing unit of the first cell group of the base station may transmit, to an inter-cell-group information sharing unit of another cell group, the maximum transmission power of a terminal, which is configured to a terminal via a radio resource signal, for all cells in each cell group, and the maximum transmission power of a terminal for a cell in the total M cell groups. According to an embodiment of the disclosure, the terminal transmission power controller of each cell in the M cell groups may determine a target cell for dynamically performing an operation of controlling transmission power of a corresponding terminal during a transmission interval within the operation period T for a terminal supporting dynamic power distribution, based on the information on whether uplink transmission for each cell of each cell group is performed, acquired by the information processor.

According to an embodiment of the disclosure, for the non-real-time terminal transmission power control, likewise as the real-time terminal transmission power control, the inter-cell-group information sharing unit of the first cell group determines a dynamic power distribution management mode for a cell in the total M cell groups and transmits the same to an inter-cell-group information sharing unit of another cell group. The dynamic power distribution mode may include the same four modes (the power distribution method of FIG. 5 to FIG. 8) as those of the real-time terminal transmission power distribution control operation.

Unlike that illustrated in FIG. 9A and FIG. 9B, transmission interval-based power distribution may be performed at a certain time point, i.e., in the aperiodic manner. The power distribution may be performed for cell groups or cells performing uplink transmission during an interval (one or more TTIs) designated in advance, at the time of occurrence of a particular event.

Figure 10:
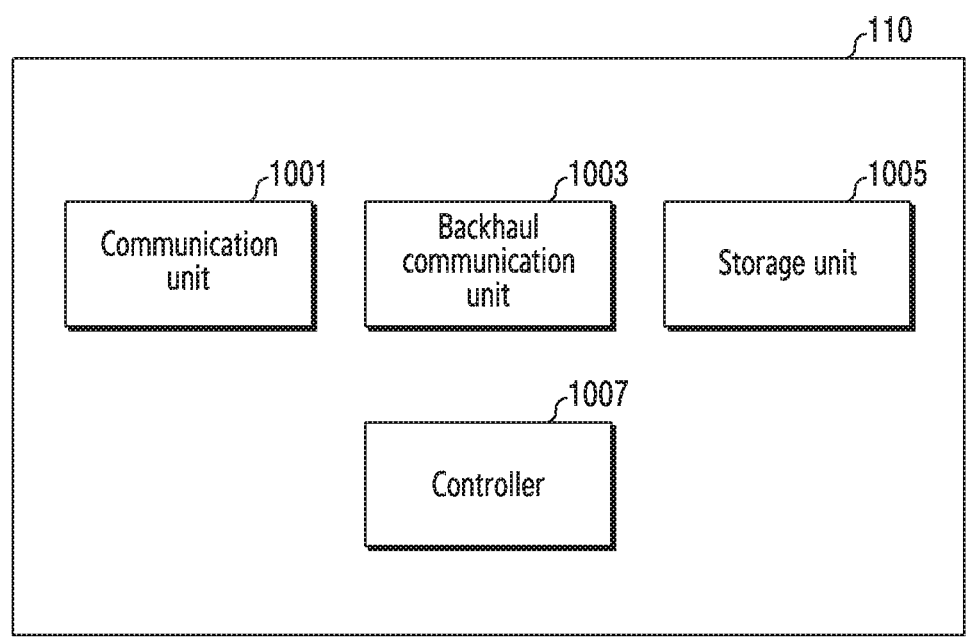
FIG. 10 illustrates a functional configuration of a base station in a wireless communication system according to an embodiment of the disclosure.

FIG. 10 illustrates a functional configuration of a base station 110 in a wireless communication system according to an embodiment of the disclosure. The functional configuration illustrated in FIG. 10 may be understood as a configuration of the base station 110. The term "unit", "-or/er", or the like, to be used below may indicate a unit for processing at least one function or operation, and may be implemented by hardware, software, or a combination thereof.

Referring to FIG. 10, the base station 110 includes a wireless communication unit 1001, a backhaul communication unit 1003, a storage unit 1005, and a controller 1007.

The wireless communication unit 1001 performs functions for transmitting or receiving a signal through a wireless channel. For example, the wireless communication unit 1001 may perform a function of conversion between a baseband signal and a bitstream according to a physical-layer standard of the system. For example, when transmitting data, the wireless communication unit 1001 may encode and modulate a transmission bitstream to generate complex symbols. In addition, when receiving data, the wireless communication unit 1001 may demodulate and decode a baseband signal to restore a reception bitstream. In addition, the wireless communication unit 1001 up-converts a baseband signal into a radio frequency (RF) band signal and then transmits the RF band signal through an antenna, and down-converts an RF band signal received through an antenna into a baseband signal.

To this end, the wireless communication unit 1001 may include a transmission filter, a reception filter, an amplifier, a mixer, an oscillator, a digital-to-analog converter (DAC), an analog-to-digital converter (ADC), and the like. Further, the wireless communication unit 1001 may also include multiple transmission/reception paths. Furthermore, the wireless communication unit 1001 may include at least one antenna array including multiple antenna elements. In terms of hardware, the wireless communication unit 1001 may include a digital unit and an analog unit. The analog unit may include multiple sub-units according to operating power, operating frequency, and the like. According various embodiments of the disclosure, the wireless communication unit 1001 may include a unit forming a beam, that is, a beamforming unit. For example, the wireless communication unit 1001 may include a massive MIMO unit for beamforming.

The wireless communication unit 1001 may transmit and receive a signal. To this end, the wireless communication unit 1001 may include at least one transceiver. For example, the wireless communication unit 1001 may transmit a synchronization signal, a reference signal, system information, a message, control information, data, or the like. Further, the wireless communication unit 1001 may perform beamforming. The wireless communication unit 1001 may apply a beamforming weight to a signal in order to assign directivity to a signal to be transmitted or received according to the configuration of the controller 1007. According to an embodiment of the disclosure, the wireless communication unit 1001 may generate a baseband signal according to a scheduling result and a transmission power calculation result. In addition, the RF unit in the wireless communication unit 1001 may transmit the generated signal through the antenna.

As described above, the wireless communication unit 1001 transmits and receives a signal. Accordingly, some or the entirety of the wireless communication unit 1001 may be referred to as a "transmitter", a "receiver", or a "transceiver". In addition, hereinafter, transmission and reception performed through a wireless channel are used to have a meaning including the processing performed by the wireless communication unit 1001 as described above.

The backhaul communication unit 1003 provides an interface for performing communication with other nodes in the network. For example, the backhaul communication unit 1003 converts a bitstream transmitted from the base station 110 to another node, for example, another access node, another base station, a higher node, a core network, or the like, into a physical signal, and converts a physical signal received from another node into a bitstream. According to various embodiments of the disclosure, the backhaul communication unit 1003 may transmit power allocation information of a cell group for the base station including the backhaul communication unit 1003 to another base station (e.g., a certain SN), or may receive power allocation information of a cell group of another base station. Here, the power allocation information means the transmission interval-based power allocation or operation period-based power allocation described in FIG. 5 to FIG. 9B above.

The storage unit 1005 stores a basic program for operating a base station 110, an application program, and data such as configuration information. The storage unit 1005 may include volatile memory, nonvolatile memory, and a combination of volatile memory and nonvolatile memory. The storage unit 1005 provides data stored according to a request from the controller 1007. According to an embodiment of the disclosure, the storage unit 1005 may include a terminal information management unit including information relating to a terminal. The terminal information may include channel information, average capacity information, and data to be transmitted of each terminal.

The controller 1007 controls the overall operation of the base station. For example, the controller 1007 may transmit and receive a signal through the wireless communication unit 1001 or the backhaul communication unit 1003. In addition, the controller 1007 records data in the storage unit 1005 and reads the recorded data therefrom. The controller 1007 may perform the functions of a protocol stack required by a communication standard. To this end, the controller 1007 may include at least one processor. In some embodiments of the disclosure, the controller 1007 may include a power calculator. In order to calculate power of cell groups for multiple base stations, necessary power information may be received from another base station and power to be allocated to each of the cell groups may be calculated based on the necessary power information. Further, according to various embodiments of the disclosure, the controller 1007 may include a power allocator. The controller 1007 may allocate power for a cell group of a base station including the controller 1007 based on power allocation information calculated by the controller 1007 itself or received from another network entity (e.g., another base station or a separate power calculation apparatus). As described above, the power allocation in the disclosure may include explicit power configuration, resource allocation information (e.g., the number of resource blocks (RBs)), a modulation and coding scheme (MCS), and a power control command (e.g., a transmit power control (TPC) command).

The power calculator and the power allocator may be, as a command set or code stored in the storage 1005, a command/code which at least temporarily resides in the controller 1007, a storage space in which a command/code is stored, or a part of the circuitry constituting the controller 1007. Meanwhile, according to another embodiment of the disclosure, a scheduler and a transmission power calculator may be independently implemented in individual apparatuses, respectively. According to various embodiments of the disclosure, the controller 1007 may control the base station 110 to perform operations according to various embodiments to be described below.

The configuration of the base station 110 illustrated in FIG. 10 is a mere example of a base station, and an example of a base station for performing various embodiments is not limited by the configuration illustrated in FIG. 10. For example, according to various embodiments of the disclosure, a part of the configuration may be added, deleted, or changed.

In FIG. 10, the base station is described as one entity, but the disclosure is not limited thereto. The base station according to various embodiments may be implemented to form an access network having not only integrated deployment but also distributed deployment. According to an embodiment of the disclosure, the base station is divided into a central unit (CU) and a digital unit (DU), wherein the CU may be implemented to perform upper layer functions (e.g., a packet data convergence protocol (PDCP) and RRC) and the DU may be implemented to perform lower layer functions (e.g., a medium access control (MAC) and physical (PHY)). The DU of the base station may form a beam coverage on a wireless channel.

In addition, in FIG. 10, it is described that the base station performs an operation of distributing the entire power to each cell group, but the disclosure is not limited thereto. For example, a particular base station and another base station may perform power distribution for cell groups and may allocate power to each cell group. In another example, a separate upper network entity connected to base stations may perform power distribution for cell groups and may allocate power to each cell group.

Figure 11:
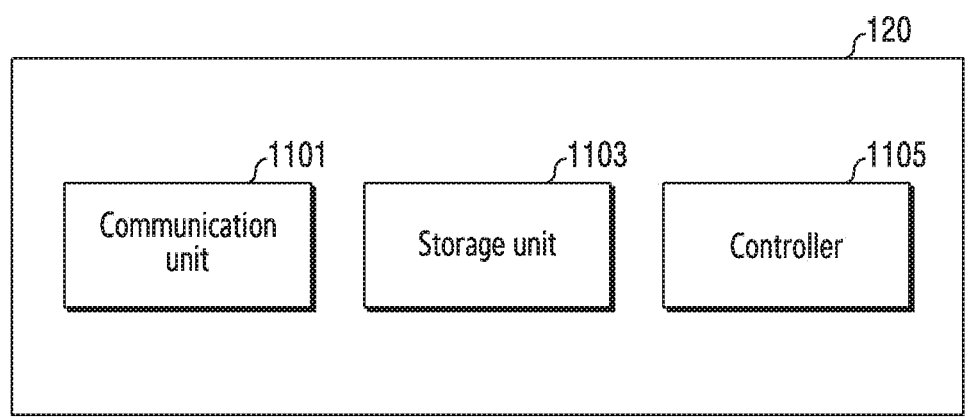
FIG. 11 illustrates a functional configuration of a terminal in a wireless communication system according to an embodiment of the disclosure.

FIG. 11 illustrates a functional configuration of a terminal in a wireless communication system according to an embodiment of the disclosure. The configuration illustrated in FIG. 11 may be understood to be a configuration of the terminal 120. The term "unit", "-or/er", or the like, to be used below may indicate a unit for processing at least one function or operation, and may be implemented by hardware, software, or a combination thereof.

Referring to FIG. 11, the terminal 120 includes a communication unit 1101, a storage unit 1103, and a controller 1105.

The communication unit 1101 performs functions for transmitting or receiving a signal through a wireless channel. For example, the communication unit 1101 performs a function of conversion between a baseband signal and a bitstream according to a physical-layer standard of the system. For example, when transmitting data, the communication unit 1101 encodes and modulates a transmission bitstream to generate complex symbols. In addition, when receiving data, the communication unit 1101 demodulates and decodes a baseband signal to restore a reception bitstream. In addition, the communication unit 1101 up-converts a baseband signal into an RF base signal and then transmits the RF band signal through an antenna, and down-converts an RF base signal received through an antenna into a baseband signal. For example, the communication unit 1101 may include a transmission filter, a reception filter, an amplifier, a mixer, an oscillator, a DAC, an ADC, and the like.

In addition, the communication unit 1101 may include multiple transmission/reception paths. Furthermore, the communication unit 1101 may include an antenna unit. The communication unit 1101 may include at least one antenna array including multiple antenna elements. In terms of hardware, the communication unit 1101 may include a digital circuit and an analog circuit (e.g., a radio frequency integrated circuit (RFIC)). Here, the digital circuit and the analog circuit may be implemented in a single package. Further, the communication unit 1101 may also include multiple RF chains. The communication unit 1101 may perform beamforming. The communication unit 1101 may apply a beamforming weight to a signal in order to assign directivity to a signal to be transmitted or received according to the configuration of the controller 1105. According to an embodiment of the disclosure, the communication unit 1101 may include a radio frequency (RF) block (or an RF unit). The RF block may include a first RF circuitry related to an antenna and a second RF circuitry related to baseband processing. The first RF circuitry may be referred to as an "RF-antenna (A)". The second RF circuitry may be referred to as an "RF-baseband (B)".

Further, the communication unit 1101 may transmit or receive a signal. To this end, the communication unit 1101 may include at least one transceiver. The communication unit 1101 may receive a downlink signal. The downlink signal may include a synchronization signal (SS), a reference signal (RS) (e.g., a cell-specific reference signal (CRS) and a demodulation (DM)-RS), system information (e.g., an MIB, an SIB, remaining system information (RMSI), other system information (OSI)), a configuration message, control information, downlink data, or the like. Further, the communication unit 1101 may transmit an uplink signal. The uplink signal may include a random access-related signal (e.g., a random access preamble (RAP) (or message 1 (Msg1) or message 3 (Msg3)), a reference signal (e.g., a sounding reference signal (SRS) and a DM-RS), a power headroom report (PHR), or the like.

In addition, the communication unit 1101 may include different communication modules for processing signals of different frequency bands. Further, the communication unit 1101 may include a plurality of communication modules to support different multiple radio access techniques. For example, different radio access techniques may include Bluetooth low energy (BLE), Wi-Fi, Wi-Fi gigabyte (Wi-Gig), and a cellular network (e.g., long term evolution (LTE) and new radio (NR)). Further, the different frequency bands may include a super high frequency (SHF) (e.g., 2.5 GHz and 5 GHz) band and a millimeter (mm) wave (e.g., 38 GHz, 60 GHz, and the like) band. Further, the communication unit 1101 may use the same method of wireless access technology on an unlicensed band for different frequency bands (e.g., a licensed assisted access (LAA)) and citizens broadband radio service (CBRS) (e.g., 3.5 GHz)).

As described above, the communication unit 1101 transmits and receives a signal. Accordingly, some or the entirety of the communication unit 1101 may be referred to as a "transmitter", a "receiver", or a "transceiver". In addition, hereinafter, transmission and reception performed through a wireless channel are used to have a meaning including the processing performed by the communication unit 1101 as described above.

The storage unit 1103 stores a basic program for operating a terminal 120, an application program, and data, such as configuration information. The storage unit 1103 may include volatile memory, nonvolatile memory, and a combination of volatile memory and nonvolatile memory. The storage unit 1103 provides data stored according to a request from the controller 1105. According to various embodiments of the disclosure, the storage unit 1103 may store direction information on each beam of the beam set or auxiliary beam pair to be operated in the terminal 120.

The controller 1105 controls the overall operation of the terminal 120. For example, the controller 1105 transmits and receives a signal through the communication unit 1101. In addition, the controller 1105 records data in the storage unit 1103 and reads the recorded data therefrom. The controller 1105 may perform the functions of a protocol stack required by the communication standard. To this end, the controller 1105 may include at least one processor. The controller 1105 may include at least one processor or a micro-processor, or may be a part of a processor. Further, a part of the communication unit 1101 and the controller 1105 may be referred to as a communication processor (CP). The controller 1105 may include various modules for performing communication. According to various embodiments of the disclosure, the controller 1105 may control the terminal to perform operations according to various embodiments to be described below.

In the disclosure, suggested are a method and an apparatus for distributing terminal transmission power by a base station, which: at the time of complex operation of a combination of multiple-connectivity and a carrier or multiple-connectivity operation including a cell group in heterogeneous or homogeneous wireless communication base stations, dynamically adjust terminal transmission power according to an uplink channel of each cell in each cell group; prevent transmission power attenuation of a terminal and inefficient usage of transmission power between cells; and improve the uplink transmission quality.

Various embodiments may be applicable to a base station operation and apparatus for dynamically adjusting terminal transmission power between two base stations in: the evolved universal terrestrial radio access-new radio dual-connectivity (EN-DC) connected to a 4G core network between a 4G primary cell group and a 5G secondary cell group; NG-RAN evolved universal terrestrial radio access-new radio dual-connectivity (NGEN-DC) connected to a 5G core network between a 4G primary cell group and a 5G secondary cell group; new radio-evolved universal terrestrial radio access dual-connectivity (NE-DC) connected to a 5G core network between a 4G secondary cell group and a 5G primary cell group; and multi radio dual-connectivity (MR-DC) including new radio dual-connectivity (NR-DC) connected between 5G cell groups, defined according to the 3GPP standard.

An embodiment may be applicable to a base station operation and apparatus for dynamically adjusting transmission power of a terminal for one or more cells having the same uplink transmission time point in the MR-DC operation of the above-described various 3GPP standards, wherein the same time-division or frequency-division multiplexing and different time-division or frequency-division multiplexing between cell groups and cells in a cell group of one or more base stations are supported.

An embodiment may be applicable to a base station operation and apparatus for adjusting terminal transmission power in real-time based on real-time information sharing between cell groups and cells in a cell group of one or more base stations, in the MR-DC operation of the above-described various 3GPP standards.

An embodiment may be applicable to a base station operation and apparatus for adjusting terminal transmission power according to a certain period and based on non-real-time information sharing between cell groups and cells in a cell group of one or more base stations, in the MR-DC operation of the above-described various 3GPP standards.

An embodiment may be applicable to a base station distribution operation and apparatus for adjusting cell group-specific terminal transmission power for each cell based on the same information between cells in a cell group, in the MR-DC operation of the above-described various 3GPP standards.

An embodiment may be applicable to a base station operation and apparatus for predicting necessary power of each cell based on power headroom report information of each cell in a cell group, in the MR-DC operation of the above-described various 3GPP standards.

Since multiple-connectivity is configured for a terminal according to various embodiments of the disclosure, the terminal may receive uplink scheduling information from a base station of each cell group. Whether to execute the power distribution of the disclosure may be identified based on the amount of scheduling received from each base station. According to an embodiment of the disclosure, whether to execute the disclosure may be identified based on the amount of allocated power changing depending on whether a control channel (PUCCH) exists. When the case in which an NR PUCCH exists and the case the NR PUCCH does not exist and an NR PUSCH exists are considered in the EN-DC situation, power (a resource allocation size) distributed to a cell group of NR may be different in the above-described two cases.

Methods disclosed in the claims and/or methods according to various embodiments described in the specification of the disclosure may be implemented by hardware, software, or a combination of hardware and software. When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A power distribution method performed by a base station, in a wireless communication system, the method comprising:
    determining an operation period including one or more transmission time intervals (TTIs);
    identifying one or more first cells, in which uplink transmission is to be performed within the operation period, among a first cell group of multiple cell groups configured to a terminal;
    identifying one or more second cells, in which uplink transmission is to be performed within the operation period, among a second cell group of the multiple cell groups configured to the terminal;
    performing a power distribution of the multiple cell groups; and
    transmitting, to the terminal, uplink resource allocation information according to a result of the power distribution,
    wherein the one or more first cells are identified by the base station and the one or more second cells are identified by exchanging cell group information with another base station,
    wherein the performing of the power distribution comprises:
        allocating, preferentially, power to the first cell group including the identified one or more first cells and the second cell group including the identified one or more second cells; and
        allocating, remaining power to the multiple cell groups excluding the first cell group and the second cell group,
    wherein the uplink transmission of the one or more first cells and the uplink transmission of the one or more second cells comprises physical uplink control channel (PUCCH) transmission or physical uplink shared channel (PUSCH) transmission, and a cell group performing physical uplink control channel (PUCCH) transmission has a higher priority than a cell group performing physical uplink shared channel (PUSCH) transmission between the first cell group and the second cell group, and
    wherein priorities among the multiple cell groups excluding the first cell group and the second cell group are determined based on a priority of each cell included in the multiple cell groups excluding the first cell group and the second cell group, and the priority of each cell is determined based on at least one of a type of information, a channel quality or a type of communication service.

2. The method of claim 1, wherein the allocating of the power to the first cell group and the second cell group is performed based on a timing advance of each cell in the identified one or more first cells and the identified one or more second cells.

3. The method of claim 1, wherein a distribution power ratio between the first cell group and the second cell group is determined based on a number of the identified one or more first cells and a number of the identified one or more second cells.

4. The method of claim 1,
wherein a distribution power ratio between the first cell group and the second cell group is determined based on an uplink data size of the first cell group and an uplink data size of the second cell group.

5. A power distribution apparatus of a base station in a wireless communication system, the power distribution apparatus comprising:
at least one transceiver; and
at least one processor,
wherein the at least one processor is configured to:
  determine an operation period including one or more transmission time intervals (TTIs),
  identify one or more first cells, in which uplink transmission is to be performed within the operation period, among a first cell group of multiple cell groups configured to a terminal,
  identify one or more second cells, in which uplink transmission is to be performed within the operation period, among a second cell group of the multiple cell groups configured to the terminal,
  perform a power distribution of the multiple cell groups, and
  control the at least one transceiver to transmit, to the terminal, uplink resource allocation information according to a result of the power distribution,
wherein the one or more first cells are identified by the base station and the one or more second cells are identified by exchanging cell group information with another base station,
wherein the at least one processor is further configured to:
  allocate, preferentially, power to the first cell group including the identified one or more first cells and the second cell group including the identified one or more second cells, and
  allocate, remaining power to the multiple cell groups excluding the first cell group and the second cell group,
wherein the uplink transmission of the one or more first cells and the uplink transmission of the one or more second cells comprises physical uplink control channel (PUCCH) transmission or physical uplink shared channel (PUSCH) transmission, and a cell group performing physical uplink control channel (PUCCH) transmission has a higher priority than a cell group performing physical uplink shared channel (PUSCH) transmission between the first cell group and the second cell group, and
wherein priorities among the multiple cell groups excluding the first cell group and the second cell group are determined based on a priority of each cell included in the multiple cell groups excluding the first cell group and the second cell group, and the priority of each cell is determined based on at least one of a type of information, a channel quality or a type of communication service.

6. The power distribution apparatus of claim 5, wherein the at least one processor is configured to allocate of the power to the first cell group and the second cell group based on a timing advance of each cell in the identified one or more first cells and the identified one or more second cells.

7. The power distribution apparatus of claim 5, wherein a distribution power ratio between the first cell group and the second cell group is determined based on a number of the identified one or more first cells and a number of the identified one or more second cells.

8. The power distribution apparatus of claim 5,
wherein a distribution power ratio between the first cell group and the second cell group is determined based on an uplink data size of the first cell group and an uplink data size of the second cell group.

* * * * *